(12) United States Patent
Yamaguchi et al.

(10) Patent No.: US 10,349,220 B2
(45) Date of Patent: Jul. 9, 2019

(54) ASSOCIATION SYSTEM, IN-VEHICLE DEVICE, ASSOCIATION METHOD

(71) Applicant: Clarion Co., Ltd., Saitama-shi, Saitama (JP)

(72) Inventors: Takashi Yamaguchi, Saitama (JP); Tsuyoshi Hano, Saitama (JP)

(73) Assignee: CLARION CO., LTD., Saitama (JP)

( * ) Notice: Subject to any disclaimer, the term of this patent is extended or adjusted under 35 U.S.C. 154(b) by 0 days.

(21) Appl. No.: 16/035,481

(22) Filed: Jul. 13, 2018

(65) Prior Publication Data

US 2019/0028850 A1    Jan. 24, 2019

(30) Foreign Application Priority Data

Jul. 21, 2017  (JP) ................... 2017-142171

(51) Int. Cl.
| | |
|---|---|
| H04W 24/00 | (2009.01) |
| H04W 4/029 | (2018.01) |
| H04W 4/48 | (2018.01) |
| H04W 12/06 | (2009.01) |
| B60R 25/24 | (2013.01) |

(52) U.S. Cl.
CPC ............ *H04W 4/029* (2018.02); *B60R 25/24* (2013.01); *H04W 4/48* (2018.02); *H04W 12/06* (2013.01)

(58) Field of Classification Search
CPC ........ H04W 4/029; H04W 4/48; H04W 12/06
USPC ........ 455/456.1, 410, 411, 414.1, 418, 432.1
See application file for complete search history.

(56) References Cited

U.S. PATENT DOCUMENTS

| | | | |
|---|---|---|---|
| 2009/0212950 A1* | 8/2009 | Cheng ................. | G06K 19/041 340/572.1 |
| 2014/0087680 A1* | 3/2014 | Luukkala ............... | H04W 4/90 455/404.1 |
| 2015/0116100 A1 | 4/2015 | Yang et al. | |
| 2015/0203125 A1 | 7/2015 | Penilla et al. | |

(Continued)

FOREIGN PATENT DOCUMENTS

| | | |
|---|---|---|
| EP | 2 808 204 A1 | 12/2014 |
| JP | 2016-76899 A | 5/2016 |

OTHER PUBLICATIONS

European Search Report dated Jan. 4, 2019 regarding European Patent Application No. 18183939.0 corresponding to U.S. Appl. No. 16/035,481 (7 pages).

*Primary Examiner* — Nghi H Ly
(74) *Attorney, Agent, or Firm* — Lewis Roca Rothgerber Christie LLP

(57) ABSTRACT

An in-vehicle device includes: an in-vehicle storage unit which stores an in-vehicle device ID as an identifier; a first communication unit which sends the in-vehicle device ID to a portable terminal; a vehicle position acquisition unit; and a second communication unit which sends the in-vehicle device ID and the vehicle position to the server, the portable terminal includes: a portable storage unit which stores a portable terminal ID as an identifier for identifying the portable terminal; a portable terminal position acquisition unit; and an authentication information sending unit which sends, to the server, authentication information, and the server associates the portable terminal ID and the in-vehicle device ID based on a difference between the portable terminal position included in the received authentication information and the received vehicle position.

14 Claims, 16 Drawing Sheets

(56) References Cited

U.S. PATENT DOCUMENTS

2016/0180261 A1\* 6/2016 Rosen .................... G06Q 10/02
                                                                             705/5
2016/0373999 A1\* 12/2016 Foster .................... H04W 4/02
2017/0282739 A1\* 10/2017 Cha ..................... B60L 11/1861

\* cited by examiner

FIG. 4

| PORTABLE TERMINAL POSITION HISTORY | | 111 |
|---|---|---|
| IN-VEHICLE DEVICE ID | 1001 | 1111 |
| TIME | POSITION | |
| t21 | P21 | |
| t22 | P22 | |
| t23 | P23 | |
| . | . | |
| . | . | |

| EVALUATIVE POSITION HISTORY | | | | |
|---|---|---|---|---|
| | IN-VEHICLE DEVICE ID | PORTABLE TERMINAL ID | | |
| | 1001 | 2001 | 2002 | . |
| POSITION | P11 | P21 | P221 | . |
| | P12 | P22 | P222 | . |
| | P13 | P23 | P223 | . |
| | . | . | . | . |
| | . | . | . | . |
| | IN-VEHICLE DEVICE ID | PORTABLE TERMINAL ID | | |
| | 1002 | 2008 | 2009 | . |
| POSITION | P121 | . | | . |
| | P122 | . | | . |
| | P123 | . | | . |
| | . | . | | . |
| | . | . | | . |

312

ASSOCIATION SYSTEM, IN-VEHICLE DEVICE, ASSOCIATION METHOD

INCORPORATION BY REFERENCE

The disclosure of the following priority application is herein incorporated by reference: Japanese Patent Application No. 2017-142171 filed Jul. 21, 2017

TECHNICAL FIELD

The present invention relates to an association system, an in-vehicle device, and an association method.

BACKGROUND ART

Portable terminals carried by individuals are becoming even more highly functional, and there are needs for operating various devices using such portable terminals to improve the convenience of users. PTL 1 (Japanese Unexamined Patent Application Publication No. 2016-76899) discloses a system of reading, via wireless signals, information of a device existing near the vehicle, and performing control of causing a vehicle to execute predetermined operations when predetermined authentication with such device is enabled based on the information, wherein the predetermined authentication comprises a function of determining that the authentication was enabled when the device has been paired with the system in advance, and comprises a plurality of devices that have been paired with the system in advance.

SUMMARY OF INVENTION

Technical Problem

With the invention described in PTL 1, it is not possible to easily associate devices as the technology is based on the premise that pairing operations, which are complicated for a user who is not familiar with such operations, have been completed.

Solution to Problem

The association system according to the first mode of the present invention is an association system includes an in-vehicle device, a portable terminal, and a server, wherein the in-vehicle device comprises: an in-vehicle storage unit which stores an in-vehicle device ID as an identifier for identifying the in-vehicle device; a first communication unit which sends the in-vehicle device ID to the portable terminal; a vehicle position acquisition unit which acquires a vehicle position as a position of the in-vehicle device; and a second communication unit which sends the in-vehicle device ID and the vehicle position to the server, wherein the portable terminal comprises: a portable storage unit which stores a portable terminal ID as an identifier for identifying the portable terminal; a portable terminal position acquisition unit which acquires a portable terminal position as a position of the portable terminal; and an authentication information sending unit which sends, to the server, authentication information including the portable terminal ID, the received in-vehicle device ID, and the portable terminal position, and wherein the server comprises: an association unit which associates the portable terminal ID and the in-vehicle device ID based on a difference between the portable terminal position included in the received authentication information and the received vehicle position.

The in-vehicle device according to the second mode of the present invention is an in-vehicle device which communicates with a portable terminal and a server, includes: an in-vehicle storage unit which stores an in-vehicle device ID as an identifier for identifying the in-vehicle device; a first communication unit which sends the in-vehicle device ID to the portable terminal; a vehicle position acquisition unit which acquires a vehicle position as a position of the in-vehicle device; and a second communication unit which sends the in-vehicle device ID and the vehicle position to the server.

The association method according to the third mode of the present invention is an association method which is executed in an in-vehicle device, a portable terminal, and a server, includes the steps of: the in-vehicle device: storing an in-vehicle device ID as an identifier for identifying the in-vehicle device; sending the in-vehicle device ID to the portable terminal within a predetermined communication range; calculating a vehicle position as a position of the in-vehicle device; and sending the in-vehicle device ID and the vehicle position to the server, and the portable terminal: storing a portable terminal ID as an identifier for identifying the portable terminal; calculating a portable terminal position as a position of the portable terminal; receiving the in-vehicle device ID from the in-vehicle device without any operation of the portable terminal by a user within the predetermined communication range; and sending, to the server, authentication information configured from the portable terminal ID, the received in-vehicle device ID, and the portable terminal position, wherein the server associates the portable terminal ID and the in-vehicle device ID based on a difference between the received portable terminal position and the received vehicle position.

Advantageous Effects of Invention

According to the present invention, the appropriate portable terminal can be associated with the in-vehicle device without requiring the user's operation.

BRIEF DESCRIPTION OF DRAWINGS

FIG. 4 is a diagram showing an example of the portable terminal position history 111.

FIG. 5 is a diagram showing an example of the evaluative position history 312.

DESCRIPTION OF EMBODIMENTS

First Embodiment

The first embodiment of the authentication system S is now explained with reference to FIG. 1 to FIG. 10.

(Configuration of Authentication System S)

Figure 1:
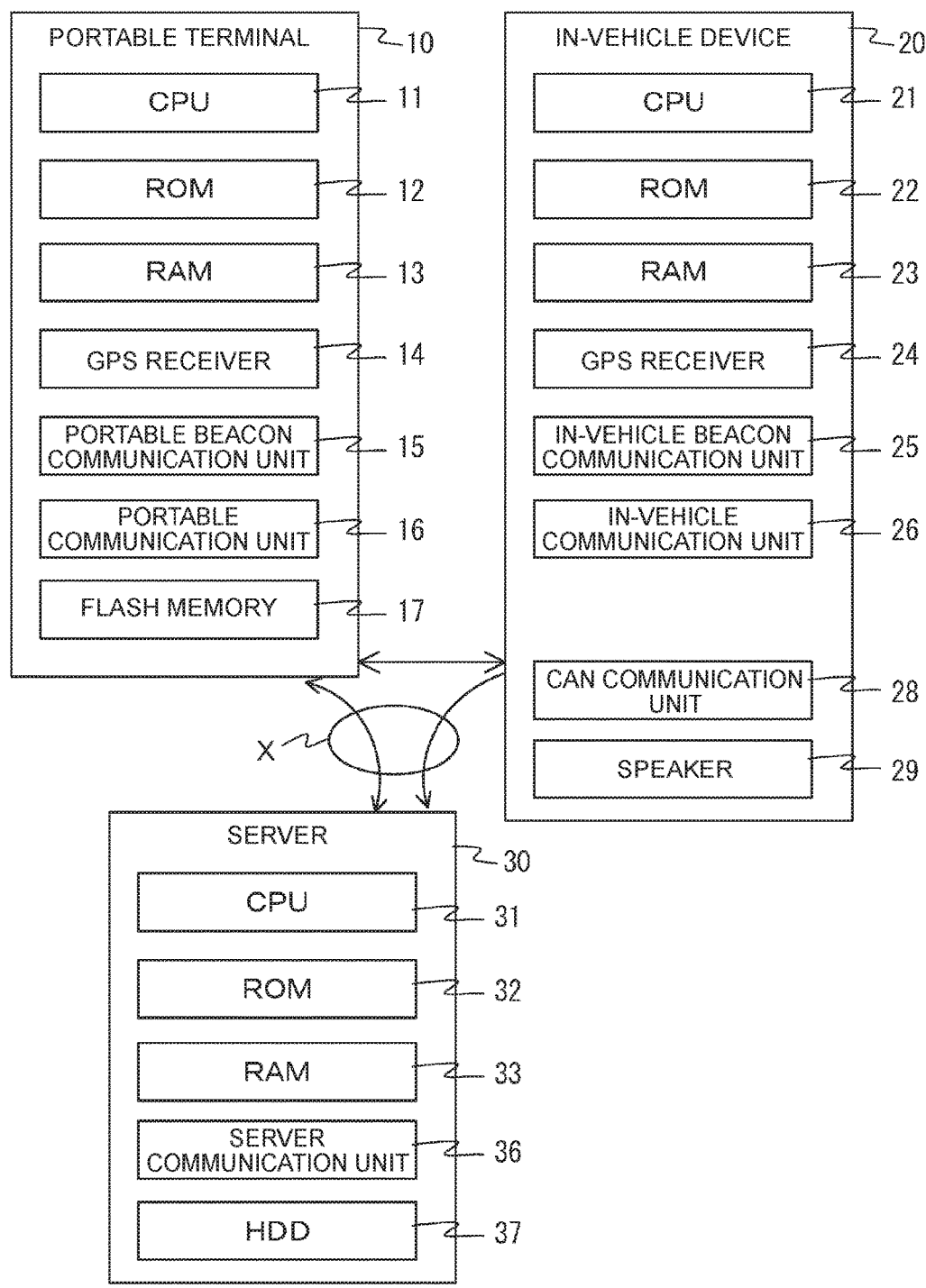
FIG. 1 is a hardware configuration diagram of an authentication system S.

FIG. 1 is a hardware configuration diagram of an authentication system S. The authentication system S comprises a portable terminal 10, an in-vehicle device 20, and a server 30. While FIG. 1 only illustrates one portable terminal 10, the authentication system S includes a plurality of portable terminals 10 and a plurality of in-vehicle devices 20. However, because all portable terminals 10 and in-vehicle devices 20 have the same configuration and operation, in the ensuing explanation one portable terminal 10 and one in-vehicle device 20 will be explained. The portable terminal 10, the in-vehicle device 20, and the server 30 are connected via a broad area wireless communication network X. In this embodiment, communication via the wireless communication network X is two-way communication between the portable terminal 10 and the server 30, and one-way communication from the in-vehicle device 20 to the server 30.

(Hardware Configuration of Portable Terminal 10)

The portable terminal 10 comprises a CPU 11 as a central processing unit, a ROM 12 as a read-only storage device, a RAM 13 as a volatile memory such as a DRAM, a GPS receiver 14, a portable beacon communication unit 15, a portable communication unit 16, and a flash memory 17. The portable terminal 10 is a communication terminal held by each passenger of the vehicle and, for example, is a smartphone or a tablet terminal. The CPU 11 realizes the functions described later by reading the programs stored in the ROM 13 into the RAM 12 and executing such programs. The ROM 13 pre-stores a portable terminal ID as an identifier for identifying the portable terminal 10, and a prescribed maximum amount of time described later.

The GPS receiver 14 is a computer which receives radio waves from a plurality of satellites configuring a satellite navigation system and analyzes the signals contained in the radio waves to calculate the position; that is, the latitude and the longitude, of the portable terminal 10. The GPS receiver 14 outputs the calculated latitude and longitude to the CPU 11. The portable beacon communication unit 15 is a receiver which receives information of a small capacity from the in-vehicle device 20; for instance, a communication module compliant with Bluetooth (registered trademark). The portable beacon communication unit 15 can send and receive beacon signals without any prior configuration of authentication or pairing. The portable beacon communication unit 15 receives, from the in-vehicle device 20, an in-vehicle device ID as an identifier for identifying the individual in-vehicle devices 20. Moreover, the portable beacon communication unit 15 sends beacon signals to the in-vehicle beacon communication unit 25 based on the user's operation. The portable communication unit 16 communicates with the server 30 via a wireless communication network such as the internet. The portable communication unit 16 is, for example, a wireless communication module compliant with 3G, 4G, or IEEE 802.11. The flash memory 17 is a non-volatile storage device. The flash memory 17 stores the nickname of the user that was input from an input unit (not shown) by the user of the portable terminal 10. The nickname will be sufficient so as long it is able to generally identify the individual, and may be the user's name; that is, a combination of the user's last name and first name, or may be only the user's last name or only the user's first name. Moreover, the nickname may also be information that is unrelated to the user's name.

(Hardware Configuration of In-Vehicle Device 20)

The in-vehicle device 20 comprises a CPU 21 as a central processing unit, a ROM 22 as a read-only storage device, a RAM 23 as a volatile memory such as a DRAM, a GPS receiver 24, an in-vehicle beacon communication unit 25, an in-vehicle communication unit 26, a CAN communication unit 28, and a speaker 29. The in-vehicle device 20 is a communicable terminal installed in a vehicle and, for example, is a car navigation device or a tablet terminal. However, the in-vehicle device 20 may also be removed from the vehicle and used. In the ensuing explanation, the vehicle equipped with the in-vehicle device 20 is referred to as the "own vehicle".

The CPU 21 realizes the functions described later by reading the programs stored in the ROM 23 into the RAM 22 and executing such programs. The ROM 23 pre-stores an in-vehicle device ID as an identifier for identifying the in-vehicle device 20, and a prescribed maximum amount of time described later. The GPS receiver 24 is a computer which receives radio waves from a plurality of satellites configuring a satellite navigation system and analyzes the signals contained in the radio waves to calculate the position; that is, the latitude and the longitude, of the in-vehicle device 20. The GPS receiver 24 outputs the calculated latitude and longitude to the CPU 21. Note that the GPS receiver 24 may also correct the position information using the sensor information acquired by the CAN communication unit 28 described later.

The in-vehicle beacon communication unit 25 is a transmitter which sends information of a small capacity to the portable terminal 10; for instance, a communication module compliant with Bluetooth (registered trademark). The in-vehicle beacon communication unit 25 sends a beacon signal with the in-vehicle device ID as the payload when the speed of the own vehicle 2 falls below a predetermined speed; for instance, a speed that is less than 5 km per hour. The sending of beacon signals in exceptional cases will be described later. The radio waves transmitted by the in-vehicle beacon communication unit 25 are weak, and can only be received by the portable terminal 10 existing within a radius of approximately 1 meter. Moreover, this communication does not require the prior setting of authentication or pairing, and the communication can be received by the portable terminal 10 existing within the communication range.

Figure 2:
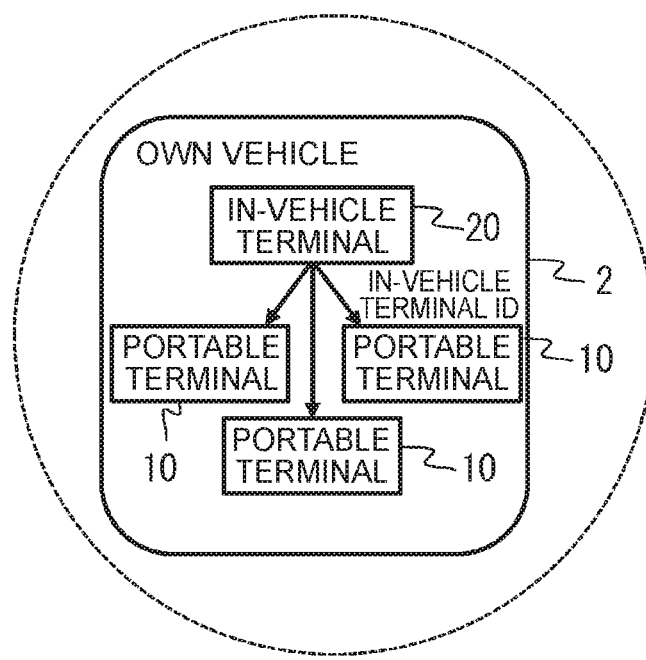
FIG. 2 is a conceptual diagram showing the transmission of beacon signals.

FIG. 2 is a conceptual diagram showing the transmission of beacon signals. The in-vehicle device 20 is installed in the own vehicle 2, and simultaneously transmits, or broadcasts, beacon signals periodically. For the beacon signals, the entire interior of the own vehicle 2 is at least the communication range, and all portable terminals 10 held by the passengers of the own vehicle 2 can receive the beacon signals. The explanation is now continued by returning to FIG. 1.

The in-vehicle communication unit 26 communicates with the server 30 via a wireless communication network such as the internet. The in-vehicle communication unit 26 is, for example, a wireless communication module compliant with 3G, 4G, or IEEE 802.11. However, the in-vehicle communication unit 26 may also be provided independently as an individual communication unit without being built into the in-vehicle device 20. The CAN communication unit 28 is a communication device compliant with a CAN (Controller Area Network) which receives sensor output values from various sensor installed in the own vehicle 2. The CAN communication unit 28 receives, for example, outputs from a speed sensor, a gyro, and ignition switch, and which respectively receive the speed of the own vehicle 2, advancing direction of the own vehicle 2, and ON/OFF information of the ignition key switch of the own vehicle 2.

The speaker 29 outputs sound; for instance, sound of a song, based on the operation command of the CPU 21. The in-vehicle device 20 comprises an input unit (not shown), and the CPU 21 outputs an operation command to the speaker 29 as a result of the passenger of the own vehicle 2 operating the input unit (not shown). However, reproduction of a song can also be controlled by operating the portable terminal 10 as described above.

(Hardware Configuration of Server 30)

The server 30 comprises a CPU 31 as a central processing unit, a ROM 32 as a read-only storage device, a RAM 33 as a volatile memory such as a DRAM, a server communication unit 36, and an HDD 37. The server 30 is a computer connected to a network. The CPU 31 realizes the functions described later by reading the programs stored in the ROM 33 into the RAM 32 and executing such programs. The server communication unit 36 communicates with the portable communication unit 16 and the in-vehicle communication unit 26. The HDD 37 is a hard disk drive. The HDD 37 stores information sent from the portable terminal 10 and the in-vehicle device 20. The HDD 37 additionally stores key information as private information that is inherent to the in-vehicle terminal 20. In other words, the foregoing key information is associated with the in-vehicle terminal ID of the in-vehicle terminal 20.

(Functional Block of Authentication System S)

Figure 3:
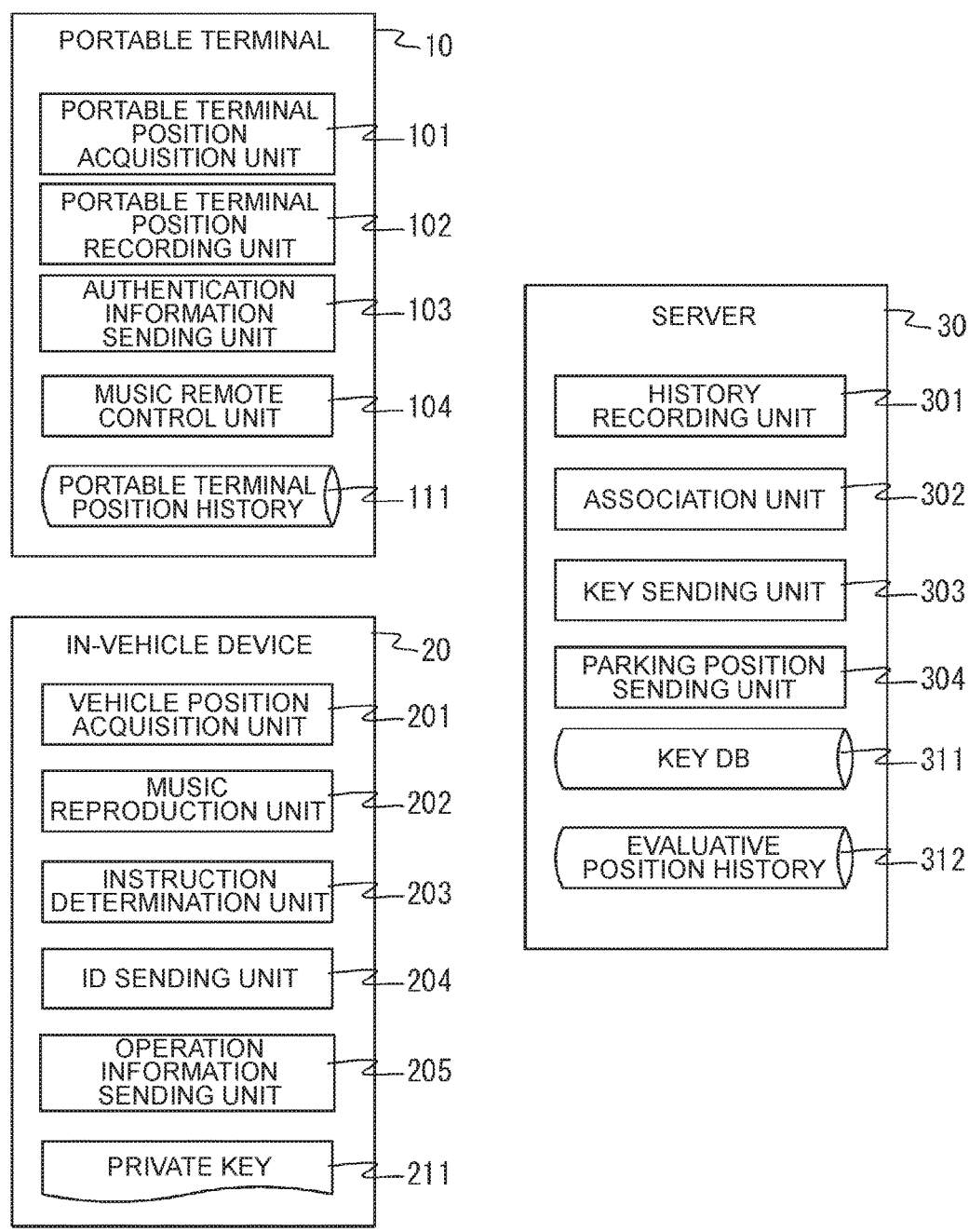
FIG. 3 is a functional configuration diagram of the authentication system S in the first embodiment.

FIG. 3 is a functional block diagram showing the functional configuration of the authentication system S.

The portable terminal 10 comprises, as its functions, a portable terminal position acquisition unit 101, a portable terminal position recording unit 102, an authentication information sending unit 103, and a music remote control unit 104. The flash memory 17 of the portable terminal 10 stores a portable terminal position history 111. However, when the portable terminal 10 acquires the key information described later from the server 30, the acquired key information is also stored in the flash memory 17.

The portable terminal position acquisition unit 101 acquires position information of the portable terminal 10 from the GPS receiver 14. When the portable terminal position recording unit 102 receives a beacon signal from the in-vehicle device 20, the portable terminal position recording unit 102 records, in the portable terminal position history 111, the in-vehicle device ID included in the received beacon signal, the time that the beacon signal was received, and the position information acquired from the GPS receiver 14 at such time. When a predetermined condition is satisfied, the authentication information sending unit 103 sends authentication information to the server 30. The expression "when a predetermined condition is satisfied" refers to a case where the beacon signal from the in-vehicle device 20 is interrupted, and a case where the number of times that the beacon signal is received reaches a predetermined number of times. Moreover, the term "authentication information" refers to the in-vehicle device ID included in the received beacon signal, the portable terminal ID stored in the ROM 12, and the portable terminal position history 111. The music remote control unit 104 is operable only when key information is stored in the flash memory 17, and sends, to the in-vehicle device 20, a user's music control command, for instance, a command for reproducing the next song, together with the key information. The portable beacon communication unit 15 is used for the communication by the music remote control unit 104.

FIG. 4 is a diagram showing an example of the portable terminal position history 111. The portable terminal position history 111 stores the value of the in-vehicle device ID included in the received beacon signal as depicted with reference numeral 1111, the time that the beacon signal was received as depicted with reference numeral 1112, and the position of the portable terminal 10 at such time as depicted with reference numeral 1113. For instance, the example shown in FIG. 4 illustrates that the portable terminal 10 received a beacon having an in-vehicle device ID of "1001" at time t21, and the position of the portable terminal 10 at such time t21 was P21. The explanation is now continued by returning to FIG. 3.

The in-vehicle device 20 comprises, as its functions, a vehicle position acquisition unit 201, a music reproduction unit 202, an instruction determination unit 203, an ID sending unit 204, and an operation information sending unit 205. Moreover, the ROM 22 stores a private key 211 in addition to the in-vehicle device ID described above. The vehicle position acquisition unit 201 acquires, from the GPS receiver 24, position information of the in-vehicle device 20 that is fixed in the own vehicle 2; that is, position information of the own vehicle 2. The music reproduction unit 202 outputs sound of a song from the speaker 29 based on input from an input unit (not shown), or an input from the instruction determination unit 203. The instruction determination unit 203 determines whether the key information included in the received signal matches the private key 211, and, upon determining that they are a match, outputs the key information, together with the received operation command, to the music reproduction unit 202. However, the private key 211 is not limited to static information, and may also be dynamic information. For example, when the private key 211 is dynamic, the private key 211 is generated by a predetermined algorithm, and the generated algorithm is shared with the server 30. Thus, the key information dynamically generated in the server 30 and the key information generated by the in-vehicle device 20 will match. When the private key 211 is generated dynamically, it may be a so-called one-time password that is used only once, or an expiration date such as 1 minute or 1 hour may be set.

When a predetermined condition is satisfied, the ID sending unit 204 broadcasts a beacon signal with the in-vehicle device ID stored in the ROM 22 as the payload. When a predetermined condition is satisfied, the operation information sending unit 205 sends, to the server 30, the in-vehicle device ID stored in the ROM 22 and the position information acquired by the vehicle position acquisition unit 201, as operation information depicting the operational state of the in-vehicle device 20. The predetermined condition of the ID sending unit 204 and the predetermined condition of the operation information sending unit 205 are the same. The private key 211 is private information that is unique to each in-vehicle device 20, and is configured, for example, from a plurality of characters or symbols.

The server 30 comprises, as its functions, a history recording unit 301, an association unit 302, a key sending unit 303, and a parking position sending unit 304. Moreover, the HDD 37 stores a key database (this is hereinafter referred to as the "key DB") 311, and an evaluative position history 312. The history recording unit 301 records in the evaluative position history 312, in the order of reception, a position of the portable terminal 10 included in the authentication information received from the portable terminal 10, and a position of the in-vehicle device 20 included in the operation information received from the in-vehicle device 20. Here, the history recording unit 301 receives the position information of the portable terminal 10 and the position information of the in-vehicle device 20 for each portable terminal ID included in the received authentication information and the in-vehicle terminal ID included in the received operation information. The association unit 302 whether it is possible to associate a certain portable terminal 10 and a certain in-vehicle device 20; to put it differently, whether a certain portable terminal 10 and a certain in-vehicle device 20 are located in the same vehicle. The association unit 302 performs the foregoing determination by using the position information recorded in the evaluative position history 312.

The key sending unit 303 sends, to the portable terminal 10 associated by the association unit 302, the key information of the in-vehicle device 20 associated with that portable terminal 10. The association unit 302 acquires the key information from the key DB 311. The parking position sending unit 304 sends, to the portable terminal 10 associated by the association unit 302, the parking position of the in-vehicle device 20 associated with that portable terminal 10; that is, the position information of the in-vehicle device 20 that was last received. The parking position sending unit 304 acquires the position information of the in-vehicle device 20 from the evaluative position history 312. The key DB 311 is a database which stores key information of various in-vehicle devices 20. This key information is the same as the information stored as the private key 211 of each portable terminal 10.

FIG. 5 is a diagram showing an example of the evaluative position history 312. The evaluative position history 312 stores the position information that was received for each in-vehicle device ID and portable terminal ID. The example shown in FIG. 5 shows that the position information of P11, P12, P13, . . . was received from the in-vehicle device 20 having an ID of "1001". Moreover, FIG. 5 additionally shows that the position information of P21, P22, P23, . . . was received from the portable terminal 10 having an ID of "2001". Furthermore, because the position information of the portable terminal 10 having an ID of "2001" is indicated next to the in-vehicle device ID of "1001", FIG. 5 shows that the in-vehicle device ID having a value of "1001" has been received in addition to the position information of P21 and the like received from the in-vehicle device 20. For example, when the in-vehicle device ID included in the authentication information that the server 30 received from the portable terminal 10 is "1002" and the portable terminal ID is "2009", position information included in the authentication information is recorded in the shaded area of FIG. 5.

(Overview of Operation)

Figure 6:
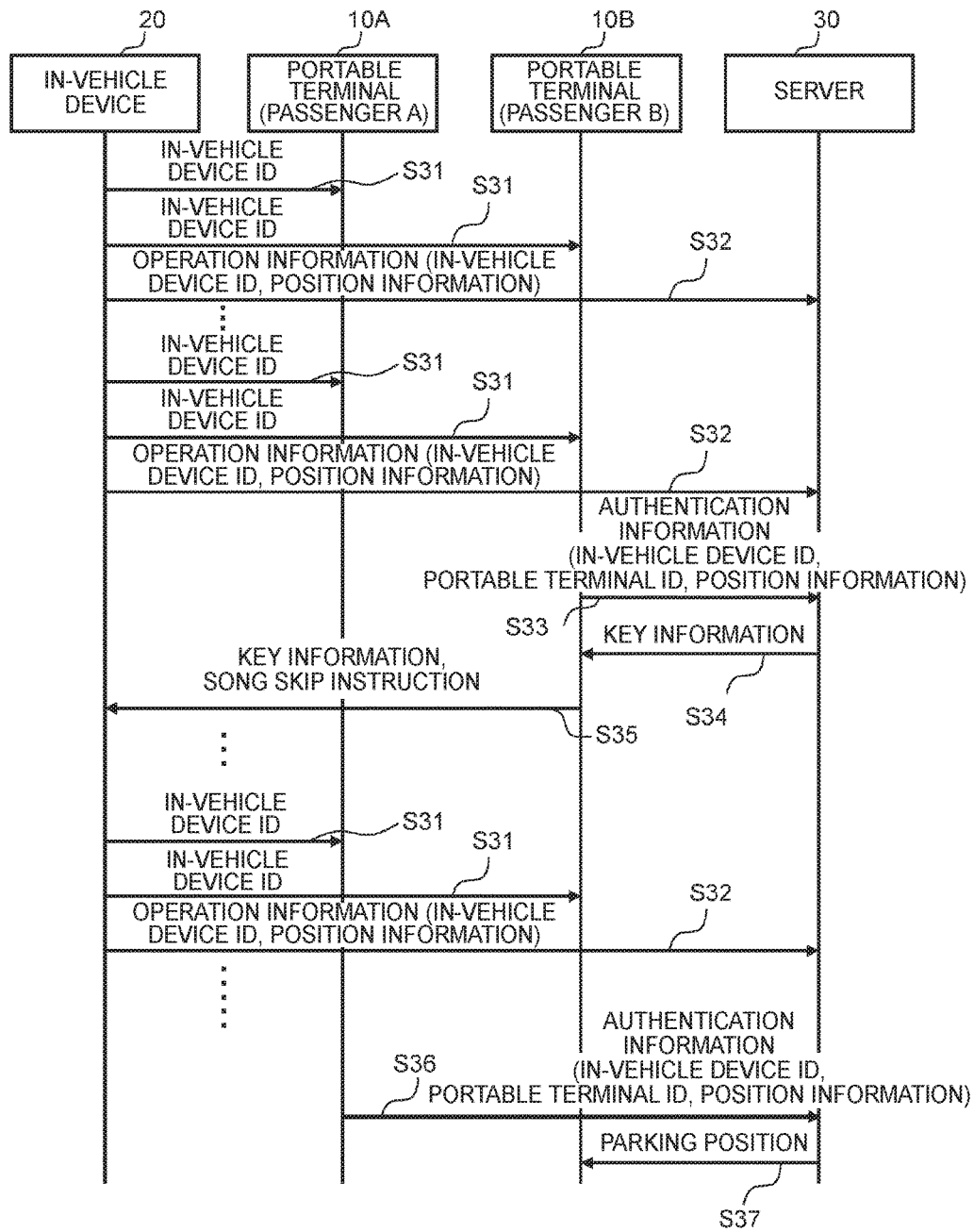
FIG. 6 is a diagram explaining an overview of the operation of the authentication system S.

The overview of the operation of the authentication system S is now explained with reference to FIG. 6. The own vehicle 2 is equipped with the in-vehicle device 20, and there are two passengers (passenger A and passenger B) other than the driver. Passenger A and passenger B each have a portable terminal. Here, the portable terminals held by passenger A and passenger B are indicated with reference numerals 10A and 10B.

While the ignition key switch of the own vehicle 2 has been turned ON by the passenger of the own vehicle 2 and is maintained in an ON state, the in-vehicle device 20 sends a beacon signal to the portable terminal 10A and the portable terminal 10B (S31) and sends operation information to the server 30 (S32) when the vehicle speed of the own vehicle 2 becomes zero. The beacon signal is used for broadcasting the in-vehicle device ID stored in the ROM 22 of the in-vehicle device 20, and is received by the portable terminal 10A and the portable terminal 10B. The operation information sent from the in-vehicle device 20 to the server 30 is configured from the in-vehicle device ID and the position information calculated by the GPS receiver 24.

The portable terminal 10A and the portable terminal 10B record the in-vehicle device ID which was received as the beacon signal and the time that such ID was received. Furthermore, the portable terminal 10A and the portable terminal 10B additionally records the position information calculated by the GPS receiver 14 at the time that such ID was received. In other words, while position information is not sent and received between the portable terminal 10 and the in-vehicle device 20, because the portable terminal 10A and the portable terminal 10B are located in the same vehicle as the in-vehicle device 20, the position information recorded in the portable terminal 10 and the position information recorded in the in-vehicle device 20 are substantially the same.

The server 30 records, in the evaluative position history 312, the in-vehicle device ID and the position information included in the received operation information. Each time the in-vehicle device 20 sends the beacon signal and the operation information, the recording of information in the portable terminal 10A, the portable terminal 10B and the server 30 is repeated.

When the portable terminal 10A and the portable terminal 10B receive the in-vehicle device ID a predetermined number of times, they send authentication information to the server 30 (S33). The authentication information sent in the foregoing case includes the history of the position information calculated by the GPS receiver 14 which was recorded each time the portable terminal 10A and the portable terminal 10B received the in-vehicle device ID from the in-vehicle device 20. The server 30 that received the authentication information compares the authentication information with the position information previously received from the in-vehicle device 20, determines that the authentication is successful when the difference between the position information is within a predetermined range, and sends key information to the portable terminal 10A and the portable terminal 10B that sent the authentication information (S34). The portable terminal 10A and the portable terminal 10B operate the in-vehicle device 20 by using the key information. The portable terminal 10A and the portable terminal 10B operate the in-vehicle device 20 by sending the key information and the command description; for example, a command for skipping to the next song (S35).

Subsequently, when the reception of the beacon signal is interrupted after the reception of the beacon signal from the in-vehicle device 20 continues several times, the portable terminal 10A and the portable terminal 10B once again sends authentication information to the server 30 (S36). To put it differently, when the portable terminal 10A and the portable terminal 10B send authentication to the server 30 when they do not once again receive the same in-vehicle device ID within a predetermined period. The server 30 that received the authentication information performs the same comparison as the first time, and, upon determining that the authentication was successful, sends the position information last received from the in-vehicle device 20 as the parking position to the portable terminal 10A and the portable terminal 10B (S37). Note that, while authentication was successful in both S34 and S37, the server 30 determines whether to send the key information as shown in S34 or whether to send the position information as shown in S37 according to the number of pieces of position information that satisfies the condition. Passenger A and passenger B can know the parking position of the own vehicle 2 without having to ask the parking position to the driver of the own vehicle 2 upon, for instance, reaching the destination and getting off the own vehicle 2, and once again getting on the own vehicle 2.

(Evaluation of Position Information)

Figure 7:
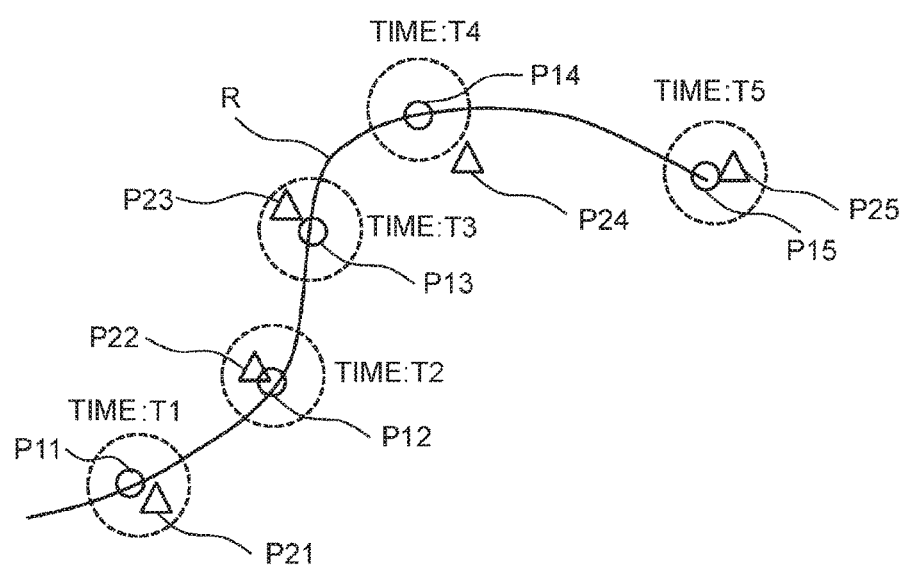
FIG. 7 is a diagram explaining the position information evaluation method performed by the server 30.

The position information evaluation method performed by the server 30 is now explained with reference to FIG. 7. The server 30 performs authentication based on the result of such position information evaluation. FIG. 7 is a schematic diagram shows the position information sent by the portable terminal 10 and the in-vehicle device 20 when the own vehicle 2 equipped with the portable terminal 10 and the in-vehicle device 20 travels. However, the position information sent by the portable terminal 10 is the history of position information included in the authentication information sent by the portable terminal 10. In FIG. 7, the meandering curve shown with reference numeral R depicts the travel path of the own vehicle 2, the triangles shown with reference numerals P11 to P15 depict the position information of the portable terminal 10, and the circles shown with reference numerals P21 to P25 depict the position information of the in-vehicle device 20. Reference numerals P11 to P15 and reference numerals P21 to P25 respectively show the positions at time T1 to time T5.

Note that, because the position information of the GPS receiver 24 installed in the in-vehicle device 20 has been corrected based on the outputs of sensors installed in the own vehicle 2, it overlaps with the travel path of the own vehicle 2 with high accuracy. Nevertheless, because the GPS receiver 14 of the portable terminal 10 does not undergo correction as with the GPS receiver 24, the position accuracy of the GPS receiver 14 is inferior in comparison to the GPS receiver 24.

The server 30 identifies the position information corresponding to the portable terminal 10 and the in-vehicle device 20 based on the order of the position information received from the portable terminal 10 and the in-vehicle device 20. Subsequently, the server 30 determines whether the difference between the position of the portable terminal 10 and the position of the in-vehicle device 20 is within a predetermined distance; for example, whether the position of the portable terminal 10 is within the circle of a radius r centered around the position of the in-vehicle device 20. In FIG. 7, the circle of the radius r centered around the position of the in-vehicle device 20 is depicted with a broken line. In the example shown in FIG. 7, while the portable terminal 10 exists within the circle of the radius 2 at time T1 to time T3, and time T5, the portable terminal 10 exists outside the circle of the radius r at time T4. The server 30 determines that the authentication was successful when the number of times that the difference between the position of the portable terminal 10 and the in-vehicle device 20 is within a predetermined distance is a predetermined number of times. Moreover, the server 30 determines that the authentication was unsuccessful when the number of times that the difference between the position of the portable terminal 10 and the in-vehicle device 20 is within a predetermined distance is less than a predetermined number of times.

(Flowchart of In-Vehicle Device)

Figure 8:
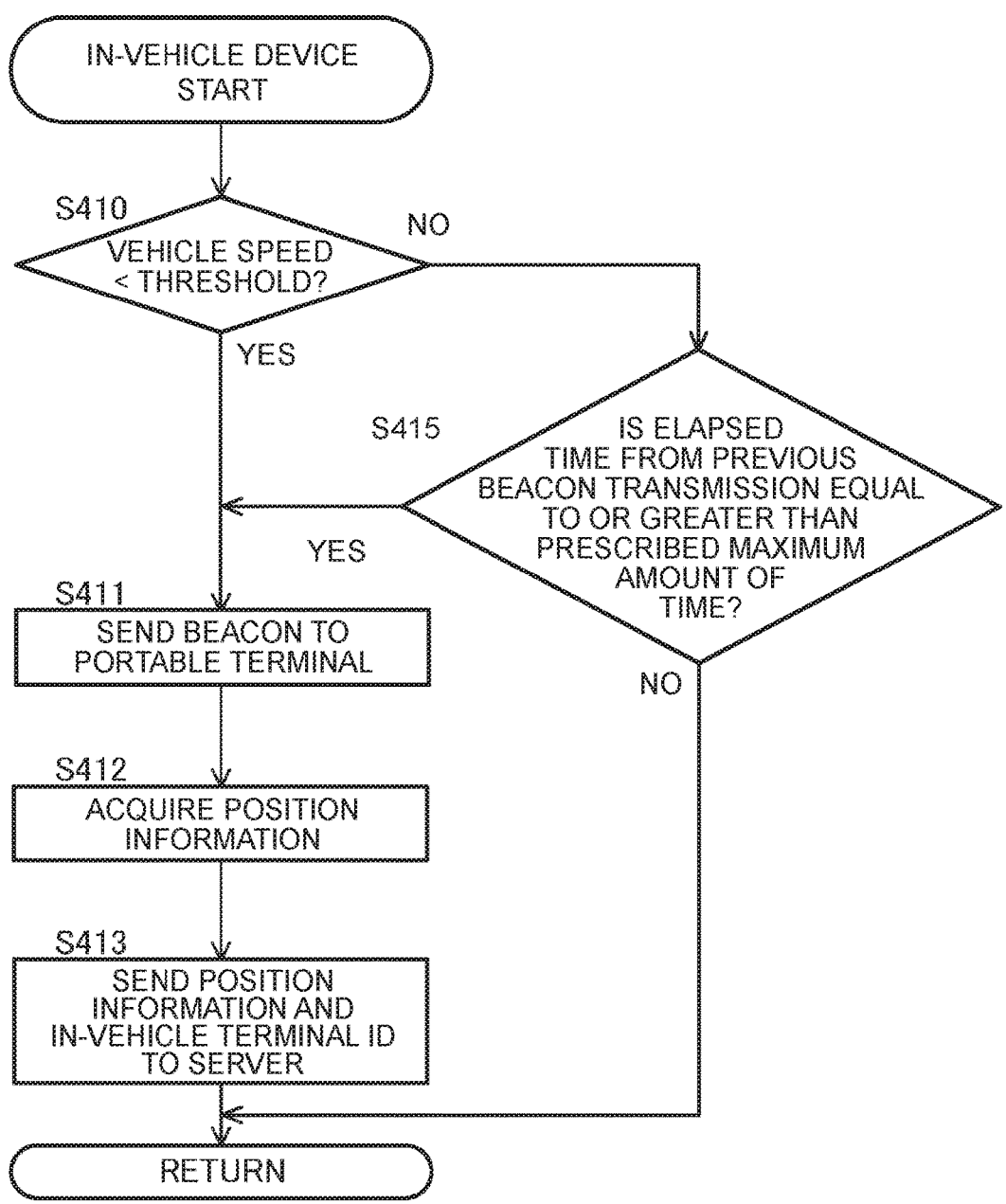
FIG. 8 is a flowchart illustrating the operation of the in-vehicle device 20.

FIG. 8 is a flowchart illustrating the operation of the in-vehicle device 20. The subject that executes the respective steps of the flowchart explained below is the CPU 21 of the in-vehicle device 20. The in-vehicle device 20 executes the program of the operation illustrated in FIG. 8, every predetermined time interval; for instance, every 10 seconds.

In step S410, the in-vehicle device 20 determines whether the vehicle speed of the own vehicle 2 obtained from the CAN communication unit 28 is less than a predetermined threshold, for instance, less than a speed of 5 km per hour. The in-vehicle device 20 proceeds to step S411 upon determining that the vehicle speed is less than the threshold, and proceeds to step S415 upon determining that the vehicle speed is equal to or greater than the threshold. In step S411, the in-vehicle device 20 uses the in-vehicle beacon communication unit 25 and sends a beacon signal to the portable terminal 10. This beacon signal stores the in-vehicle device ID of the in-vehicle device 20. In subsequent step S412, the in-vehicle device 20 acquires position information from the GPS receiver 24. In subsequent step S413, the in-vehicle device 20 uses the in-vehicle communication unit 26 sends, to the server 30, the operation information including the in-vehicle device ID and the position information acquired in step S412, and ends the program of the operation illustrated in FIG. 8.

In step S415, the in-vehicle device 20 determines whether the elapsed time from the previous beacon signal transmission is equal to or longer than a prescribed maximum amount of time; for example, 10 minutes or longer. The in-vehicle device 20 proceeds step S411 upon determining that the elapsed time is equal to or longer than a prescribed maximum amount of time, and ends the program of the operation illustrated in FIG. 8 upon determining that the elapsed time is less than a prescribed maximum amount of time. This step is provided as a measure of the so-called watch dog timer. In other words, step S415 is provided to avoid the following problem that arises when a state where the vehicle speed is higher than the threshold continues for a prolonged period of time. The purpose of this step is to prevent the portable terminal 10 from misunderstanding that the operation of the in-vehicle device 20 has stopped when a beacon signal is not sent for a long period.

(Flowchart of Portable Terminal)

Figure 9:
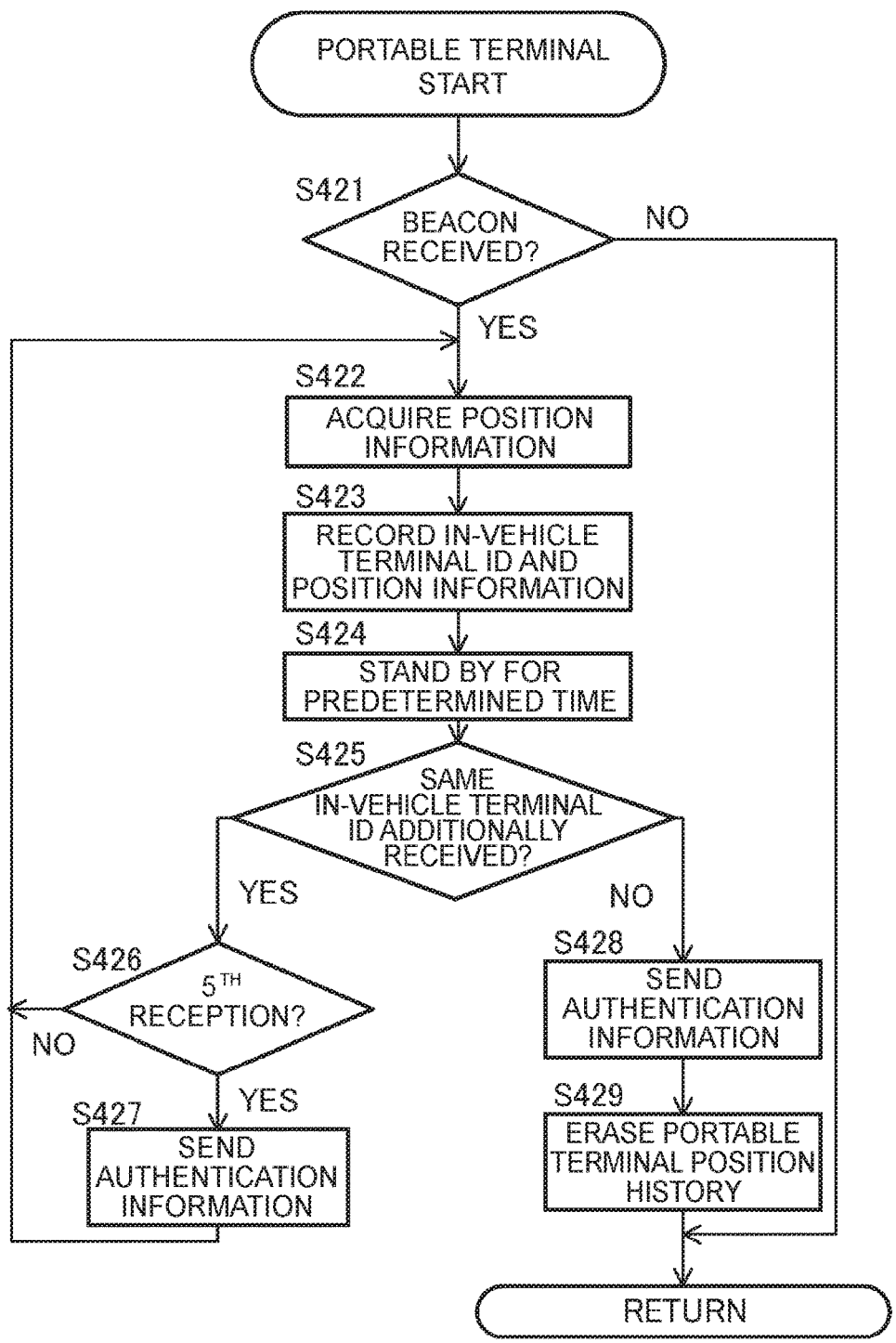
FIG. 9 is a flowchart illustrating the operation of the portable terminal 10.

FIG. 9 is a flowchart illustrating the operation of the portable terminal 10. The subject that executes the respective steps of the flowchart explained below is the CPU 11 of the portable terminal 10. The portable terminal 10 executes the program of the operation illustrated in FIG. 9 every predetermined time interval; for instance, every 10 seconds. However, the portable terminal 10 does not execute the program when the previously executed program is not yet complete.

In step S421, the portable terminal 10 determines whether a beacon signal has been received from the in-vehicle device 20. The portable terminal 10 proceeds to step S422 upon determining that a beacon signal has been received, and ends the program of the operation illustrated in FIG. 9 upon determining that a beacon signal has not been received. In step S422, the portable terminal 10 acquires position information from the GPS receiver 14. In subsequent step S423, the portable terminal 10 records, in the portable terminal position history 111, the in-vehicle device ID included in the beacon signal determined as having been received in step S421 and the position information acquired in step S422. In subsequent step S424, the portable terminal 10 stands by for a predetermined period. In the ensuing explanation, the period that the portable terminal 10 stands by in step S424 is also referred to as the "standby time". This standby time is a length that is longer than the known maximum transmission interval of beacon signals; that is, longer than the prescribed maximum amount of time. For example, when the prescribed maximum amount of time is 10 minutes, the standby time in step S424 will be 12 minutes.

In subsequent step S425, the portable terminal 10 determines whether a beacon signal having the same in-vehicle device ID as the payload has been additionally received from the in-vehicle device 20 during the standby time in step S424. The portable terminal 10 proceeds to step S426 upon determining that a beacon signal including the same in-vehicle device ID has been received, and proceeds to step S428 upon determining that a beacon signal including the same in-vehicle device ID was not received during the standby time. For example, once the own vehicle 2 arrives at the destination and the ignition key switch is turned OFF and the operation of the in-vehicle device 20 is stopped, because the transmission of beacon signals from the in-vehicle device 20 will also stop, a negative determination will be obtained in step S425.

In step S426, the portable terminal 10 determines whether the same in-vehicle device ID has been received 5 times. The portable terminal 10 proceeds to step S427 upon determining that the same in-vehicle device ID has been received 5 times, and returns to step S422 upon determining that the number of times that the same in-vehicle device ID has been received is other than 5 times. In step S427, the portable terminal 10 sends, to the server 30, authentication information; that is, the position information of the portable terminal 10 previously recorded in step S423, the in-vehicle device ID, and the portable terminal ID stored in the ROM 12, and then returns to step S422. When a negative determination is obtained in step S425, the portable terminal 10 sends, to the server 30 in step S428, authentication information; that is, the position information of the portable terminal 10 previously recorded in step S423, the in-vehicle device ID, and the portable terminal ID stored in the ROM 12, and then proceeds to step S429. In step S429, the portable terminal 10 erases the portable terminal position history 111; that is, deletes all information stored in the portable terminal position history 111, and then ends the program of the operation illustrated in FIG. 9.

(Flowchart of Server)

Figure 10:
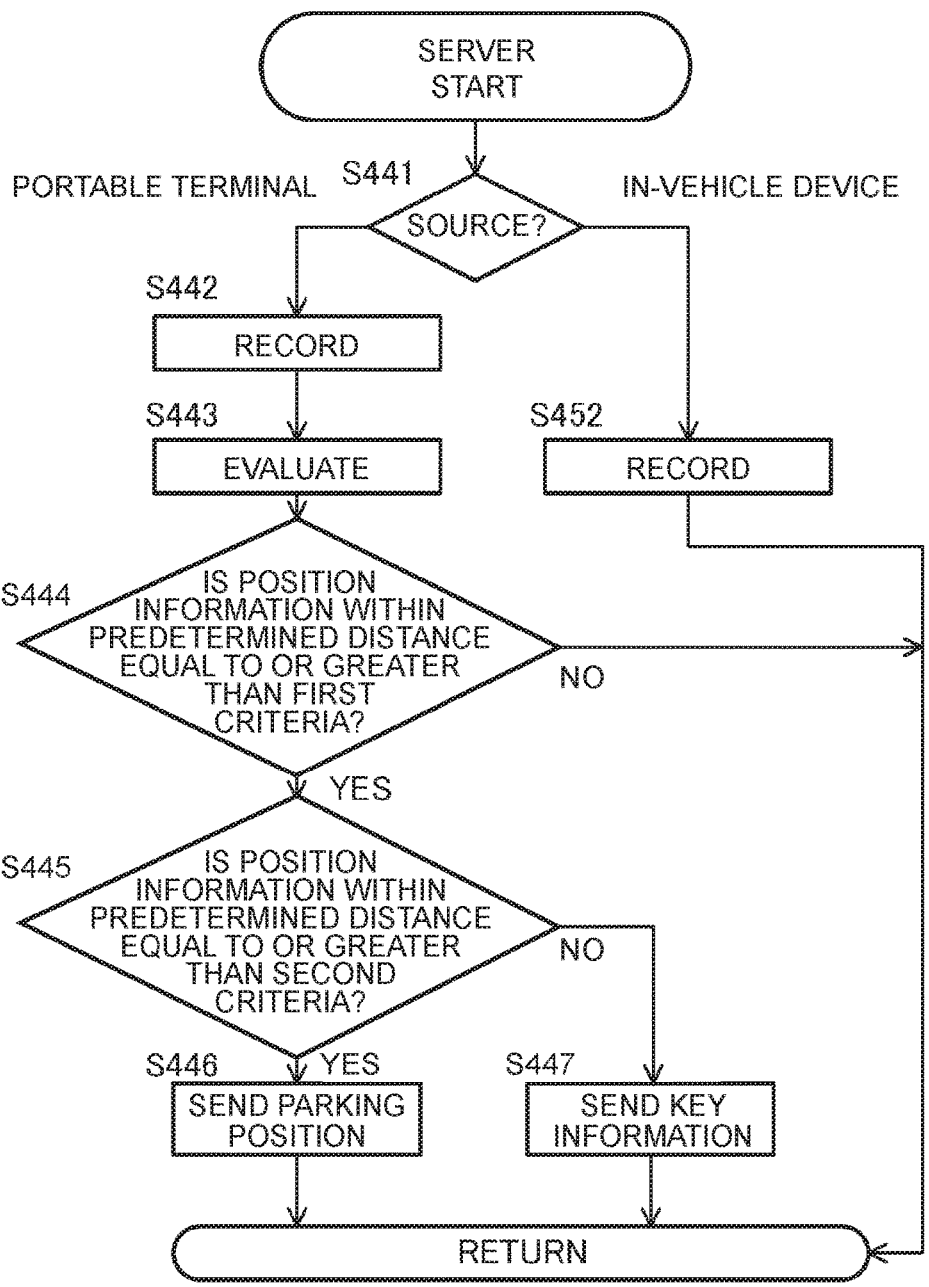
FIG. 10 is a flowchart illustrating the operation of the server 30 in the first embodiment.

FIG. 10 is a flowchart illustrating the operation of the server 30. The subject that executes the respective steps of the flowchart explained below is the CPU 31 of the server 30. The server 30 executes the program of the operation illustrated in FIG. 10 upon receiving a signal from the portable terminal 10 or the in-vehicle device 20.

In step S441, the server 30 determines whether the source of the received signal is the portable terminal 10 or the in-vehicle device 20. The server 30 proceeds to step S442 upon determining that the signal was sent from the portable terminal 10, and proceeds to step S445 upon determining that the signal was sent from the in-vehicle device 20. In step S442, the server 30 records the portable terminal ID included in the received authentication information and the history of the position information in the column of the evaluative position history 312 corresponding to the in-vehicle device ID included in the authentication information received from the portable terminal 10.

In subsequent step S443, the server 30 evaluates the received authentication information; to put it differently, evaluates the position information recorded in step S442. The specific method is as explained with reference to FIG. 7. In subsequent step S444, the server 30 determines, based on the evaluation performed in step S443, whether a combination of the position information within a predetermined distance is equal to or greater than a first criterion; for example, whether there are 4 sets or more of the position information within 1 meter corresponding to the area of the own vehicle 2. The server 30 proceeds to step S445 upon determining that a combination of the position information satisfying the condition exists in a number that is equal to or greater than a first criterion, and ends the program of the operation illustrated in FIG. 10 upon determining that a combination of the position information satisfying the condition exists in a number that is less than a first criterion.

In step S445, the server 30 determines, based on the evaluation performed in step S443, whether a combination of the position information within a predetermined distance is equal to or greater than a second criterion; for example, whether there are 100 sets or more of the position information within 1 meter. The proceeds to step S446 upon determining that a combination of the position information satisfying the condition exists in a number that is equal to or greater than a second criterion, and proceeds to step S447 upon determining that a combination of the position information satisfying the condition exists in a number that is less than a second criterion.

In step S446, the server 30 sends, to the portable terminal 10 that sent the authentication information, the parking position of the own vehicle 2; that is, the position information that was last received from the in-vehicle device 20, and then ends the program of the operation illustrated in FIG. 10. In step S447, the server 30 sends the key information of the corresponding in-vehicle device 20 to the portable terminal 10 that sent the authentication information, and then ends the program of the operation illustrated in FIG. 10. Note that the term "corresponding in-vehicle device 20" refers to the in-vehicle device 20 indicated by the in-vehicle device ID included in the sent authentication information.

In step S452, the server 30 adds the received position information to the column of the corresponding in-vehicle device ID of the evaluative position history 312, and then ends the program of the operation illustrated in FIG. 10.

The following effects are yielded according to the first embodiment described above.

(1) An authentication system S comprises an in-vehicle device 20, a portable terminal 10, and a server 30. The in-vehicle device 20 comprises a ROM 22 which stores an in-vehicle device ID as an identifier for identifying the in-vehicle device 20, an in-vehicle beacon communication unit 25 which sends the in-vehicle device ID to the portable terminal 10, a vehicle position acquisition unit 201 which acquires a vehicle position as a position of the in-vehicle device 20, and an in-vehicle communication unit 26 which sends the in-vehicle device ID and the vehicle position to the server 30. The portable terminal 10 comprises a ROM 12 which stores a portable terminal ID as an identifier for identifying the portable terminal 10, a portable terminal position acquisition unit 101 which acquires a portable terminal position as a position of the portable terminal 10, and an authentication information sending unit 103 which sends, to the server 30, authentication information including the portable terminal ID, the received in-vehicle device ID, and the portable terminal position. The server 30 comprises an association unit 302 which associates the portable terminal ID and the in-vehicle device ID based on a difference between the portable terminal position included in the received authentication information and the received vehicle position.

The portable terminal 10 sends, to the server 30, the received in-vehicle device ID and the authentication information including the position information of the portable terminal 10. The in-vehicle device 20 sends, to the server 30, the operation information including the in-vehicle device ID and the position information of the in-vehicle device. The server 30 associates the portable terminal 10 and the in-vehicle device 20 based on a difference between the position indicated with the position information included in the authentication information and the position indicated with the position information included in the operation information. Thus, the portable terminal 10 existing within a communication range of the beacon signal of the in-vehicle device 20 can be associated with the in-vehicle device 20 without requiring any operation by the user. This association leads to the provision of information related to the in-vehicle device 30 to the portable terminal 10, or the granting of authority to the portable terminal 10 for operating the in-vehicle device 20.

(2) The server 30 comprises a key database 311 which stores key information corresponding to each of the in-vehicle devices 20, and a key sending unit 303 which sends, to the portable terminal 10 having the portable terminal ID which was associated by the association unit 302, the key information corresponding to the in-vehicle device ID which was associated by the association unit 302. Thus, the portable terminal 10 placed near the in-vehicle device 20 can be associated with the in-vehicle device 20 by the server 30, and acquire the key information of the in-vehicle device 20. In other words, the portable terminal 10 placed near the in-vehicle device 20 can execute special processing, which requires the key information, to the in-vehicle device 20.

(3) The server 30 comprises a parking position sending unit 304 which sends, to the portable terminal 10 having the portable terminal ID which was associated by the association unit 302, position information which was last received from the in-vehicle device 20 having the in-vehicle device ID which was associated by the association unit 302. Thus, the portable terminal 10 placed near the in-vehicle device 20 can be associated with the in-vehicle device 20 by the server 30, and acquire the last position information of the in-vehicle device 20; that is, the parking position of the own vehicle 2. Thus, a passenger of the own vehicle 2 can easily confirm the parking position of the own vehicle 20 by referring to the portable terminal 10.

(4) The authentication information sending unit 103 of the portable terminal 10 sends authentication information when sending of the in-vehicle device ID from the in-vehicle device 20 is interrupted (step S425 of FIG. 9: NO), and when sending of the in-vehicle device ID from the in-vehicle device 20 reaches a predetermined number of times (step S426 of FIG. 9: YES).

(5) The ID sending unit 204 of the in-vehicle device 20 sends the in-vehicle device ID when a speed of the own vehicle 2 equipped with the in-vehicle device 20 falls below a predetermined speed. Thus, with the portable terminals 10 located in the same own vehicle 2, even if much time is required for the reception processing of the beacon signal, the travel distance will be short because the speed of the own vehicle 2 is slow. Accordingly, it is possible to suppress the influence caused by the travel of the own vehicle 20 on the difference between the position calculated by the GPS receiver 14 of the portable terminal 10 and the position calculated by GPS receiver 24 of the in-vehicle device 20.

Modified Example 1

In the first embodiment, the cases where the portable terminal 10 sends the authentication information were both a case when sending of the in-vehicle device ID from the in-vehicle device 20 is interrupted (step S425 of FIG. 9: NO), and a case when sending of the in-vehicle device ID from the in-vehicle device 20 reaches a predetermined number of times (step S426 of FIG. 9: YES). Nevertheless, the authentication information may be sent only in one of the foregoing cases.

Modified Example 2

The ID sending unit 204 of the in-vehicle device 20 may also broadcast a beacon signal having the in-vehicle device ID as the payload upon receiving a signal from the CAN communication unit 28 to the effect that the ignition key switch has been turned ON, and upon receiving a signal from the CAN communication unit 28 to the effect that the ignition key switch has been turned OFF.

Modified Example 3

In the first embodiment, the threshold in step S426 of FIG. 9 was 5 times. Nevertheless, this threshold may be arbitrarily changed. For example, the authentication information may be sent upon a single reception.

Modified Example 4

In the first embodiment, the first criterion in step S444 and the second criterion in step S445 of FIG. 10 were predetermined number of times. Nevertheless, evaluation may also be performed based on ratio in substitute for a predetermined number of times, and the threshold may also be changed according to the number of pieces of received position information. For example, in step S444, evaluation may be performed by determining whether 60% of the received position information is within a predetermined distance.

Modified Example 5

In the first embodiment, the music remote control unit 104 of the portable terminal 10 send a music control command to the in-vehicle device 20 by using the portable beacon communication unit 15. Nevertheless, the control command may also be sent to the in-vehicle device 20 via the server 30 by using the portable communication unit 16. For example, the music control command may be sent via communication compliant with IEEE 802.11.

Figure 11:
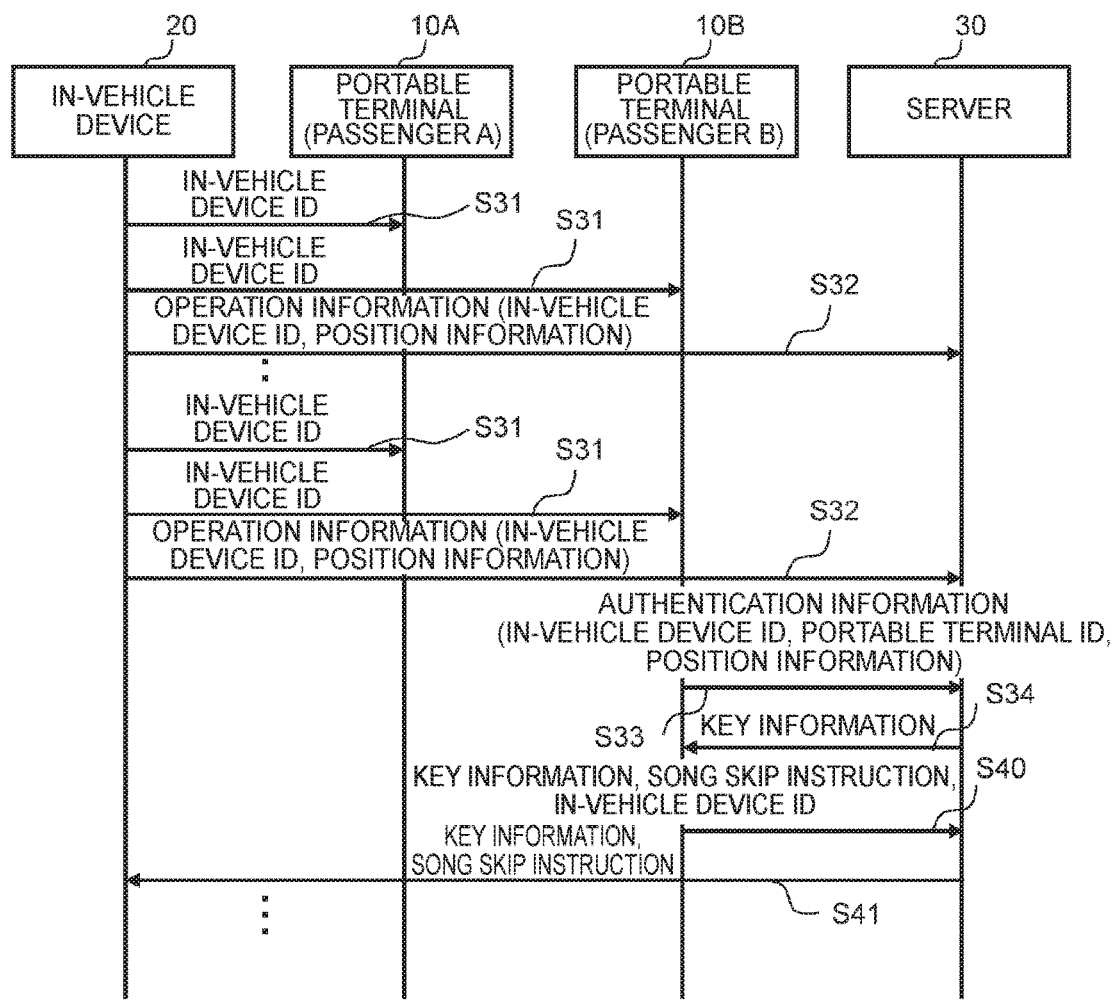
FIG. 11 is a diagram explaining the overview of the operation of the authentication system S in modified example 5.

FIG. 11 is a diagram explaining the overview of the operation of the authentication system S in modified example 5. FIG. 11 is the same as FIG. 6 in the first embodiment up to S34. In S40, the portable terminal 10B sends the key information, a song skip command, and the in-vehicle device ID to the server 30. The server 30 determines whether a combination of the received key information and in-vehicle device ID matches a combination of the key information and the in-vehicle device ID stored in the HDD 37, and sends a song skip command to the in-vehicle device upon determining that they are a match (S41). However, this song skip command is sent by adding the received key information thereto. Because the song skip command and the key information are collectively sent, the in-vehicle device 20 that received the foregoing signal determines that the request is a legitimate request from the server 30 when the received key information and private key 211 are a match.

Modified Example 6

In the first embodiment, while a Bluetooth beacon signal was used for the wireless communication from the in-vehicle device 20 to the portable terminal 10, the communication method is not limited thereto. The wireless communication from the in-vehicle device 20 to the portable terminal 10 will suffice so as long as the communication range is limited and the exchange of information is possible without requiring the user's operation. For example, NFC (Near Field Communication) may be used for the wireless communication from the in-vehicle device 20 to the portable terminal 10.

Modified Example 7

In step S424 of FIG. 9, the routine may proceed to step S425 without waiting for the lapse of the standby time in the following case. In other words, the portable terminal 10 may immediately proceed to step S425 upon receiving a beacon signal having an in-vehicle ID as the payload which is the same as the in-vehicle device ID recorded in step S423.

Modified Example 8

In step S410 of FIG. 8, whether the vehicle speed of the own vehicle 2 is less than predetermined threshold was determined. Nevertheless, in step S410, it is also possible to determine whether the vehicle speed of the own vehicle 2 is zero. In the foregoing case, because neither the portable terminal 10 nor the in-vehicle device 20 is moving if the vehicle speed is zero, the difference in the positions calculated by the portable terminal 10 and the in-vehicle device 20 will decrease, and there is an advantage in that the evaluation accuracy of the positional difference can be improved.

Modified Example 9

The in-vehicle device 20 may add an expiration date to the operation information sent to the server 30, and the server 30 may add an expiration date to the operation information received from the in-vehicle device 20. When the operation information has an expiration date, the operation information is not used in the evaluation of the position information (step S443 of FIG. 10) after the lapse of the expiration date. By adding an expiration to the operation information, it is possible to properly manage the conditions upon sending the parking position or sending the key information. The expiration date is set, for example, to 23:59 of the day that the position information was acquired.

Modified Example 10

The in-vehicle device 20 may also cause the portable terminal 10 to perform an unlocking operation of the own vehicle 2 by using the key information. For example, even in cases where the in-vehicle device 20 is constantly operated with a battery installed in the own vehicle 2 and the ignition key switch of the vehicle 2 has been turned OFF, an unlocking operation from the portable terminal 10 is accepted. Moreover, the in-vehicle device 20 may request different key information according to the operation. Furthermore, the condition that the portable terminal 10 can acquire the different key information can also be changed. For example, the server 30 may issue key information for music control when position information within a predetermined distance is acquired 4 times, but the server 30 may refrain from issuing key information for unlocking unless position information within a predetermined distance is acquired 100 times or more.

Modified Example 11

In the first embodiment described above, the server 30 determined whether to send the parking position (step S446) or send the key information (step S447) with the number of pieces of position information within a predetermined distance as the determination criterion (step S445 of FIG. 10). Nevertheless, a flag indicating the information to be requested may be included in the authentication information sent by the portable terminal 10, and the server 30 may determine which information to send by reading the flag. In the foregoing case, for example, a flag set to ON is included in the authentication information and sent in step S427 of FIG. 9, and a flag set to OFF is included in the authentication information and sent in step S428 of FIG. 9. The server 30 subsequently performs the operation illustrated in FIG. 12.

Figure 12:
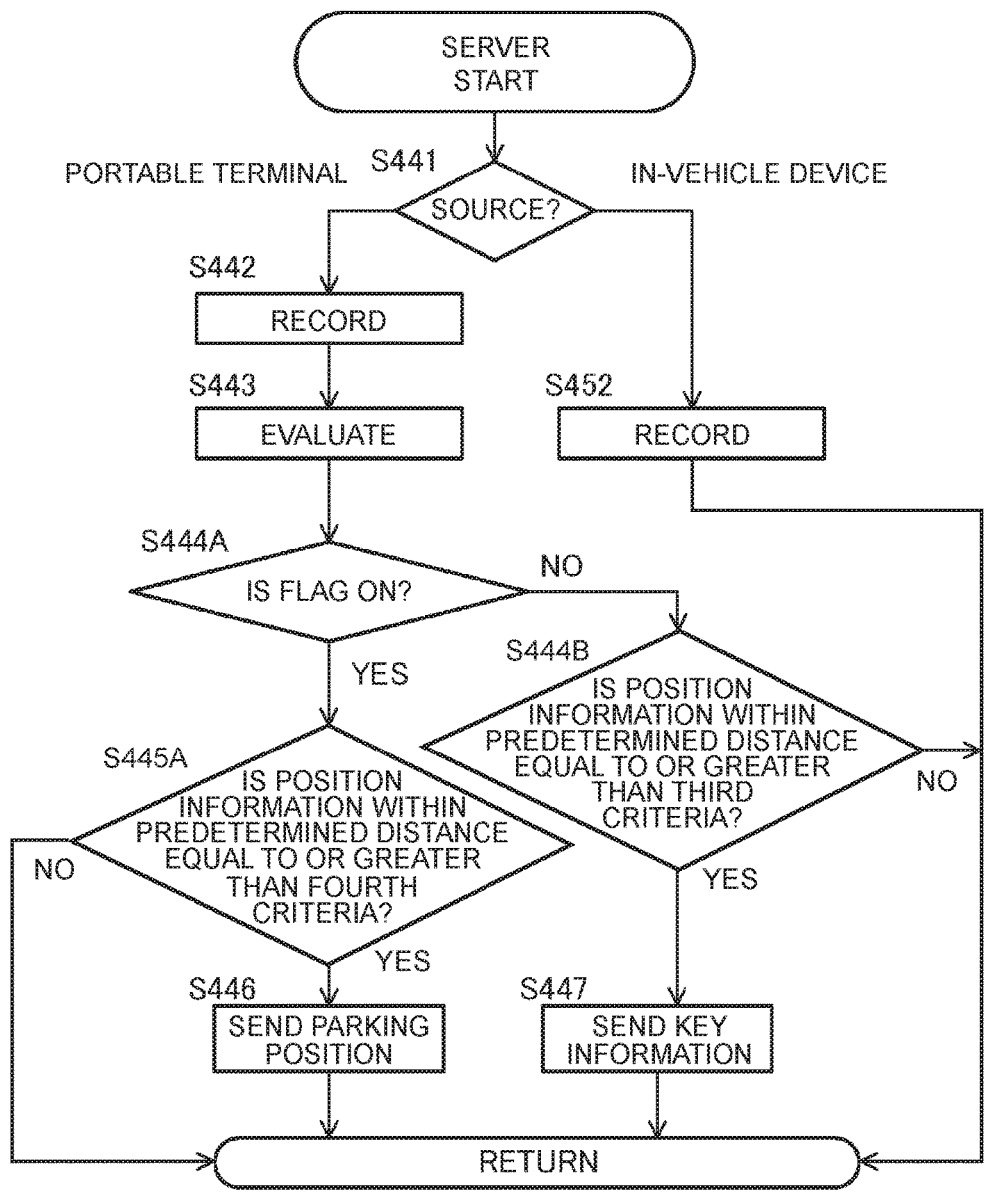
FIG. 12 is a flowchart illustrating the operation of the server 30 in modified example 11.

FIG. 12 is a flowchart illustrating the operation of the server 30 in modified example 11. In the ensuing explanation, the differences in comparison to the flowchart of FIG. 10 are explained. The server 30 proceeds to step S444 after step S443, and determines whether the flag included in the authentication information is ON. The server 30 proceeds to step S445A upon determining that the flag is ON, and proceeds to step S444B upon determining that the flag is OFF. In step S445A, the server 30 determines, based on the evaluation performed in step S443, whether a combination of position information within a predetermined distance is equal to or greater than a fourth criterion. The server 30 proceeds to step S445 upon obtaining a positive determination, and ends the program of the operation illustrated in FIG. 12 upon obtaining a negative determination. In step S445B, the server 30 determines, based on the evaluation performed in step S443, whether a combination of the position information within a predetermined distance is equal to or greater than a third criterion. The server 30 proceeds to step S447 upon obtaining a positive determination, and ends the program of the operation illustrated in FIG. 12 upon obtaining a negative determination.

The third criterion in step S444B may or may not be the same as the first criterion in step S444 of FIG. 10. The fourth criterion in step S445A may or may not be the same as the second criterion in step S445 of FIG. 10. Moreover, the third criterion and the fourth criterion may or may not be the same. When the third criterion and the fourth criterion are not the same, the third criterion may be greater than the fourth criterion or the fourth criterion may be greater than the third criterion.

Modified Example 12

The predetermined distance used by the server 30 for the determination in step S444 and step S445 of FIG. 10 was a distance corresponding to the area of the own vehicle 2, for instance, 1 meter, in the first embodiment. Nevertheless, this predetermined distance may also be determined by giving consideration to the position accuracy of the GPS receiver 14 of the portable terminal 10. For example, when the 3 sigma of the standard deviation of the positions calculated by the GPS receiver 14 is 10 meters, the predetermined distance may be set to 11 meters.

Modified Example 13

The portable terminal position history 111 may be directly included in the authentication information sent by the portable terminal 10 to the server 30. In other words, the time that the position information was recorded may be included in the authentication information. Moreover, the sent time may be included in the operation information sent by the in-vehicle device 20 to the server 30. In the foregoing case, the server 30 compares the position information included in the authentication information and the position information included in the operation information based on the times respectively included therein. In other words, certain position information included in the authentication information and the position information included in the operation information for comparing the distances shall be position information in which the difference between the times corresponding thereto are within a predetermined time; for example, within 1 minute. To put it differently, the server 30 evaluates the difference between the position of the position information included in the authentication information and the position of the position information included in the operation information in which the time difference is within a predetermined time.

Modified Example 14

In the first embodiment described above, the user ID input by the user may be used as the portable terminal ID. To put it differently, the user ID input by the user may be used in substitute for the portable terminal ID that is pre-stored in the ROM 12. Furthermore, the portable terminal ID in the first embodiment may be replaced with a combination of the portable terminal ID and the user ID. Note that the user ID is input by the user with an input unit (not shown), and stored in the flash memory 17.

Modified Example 15

In the first embodiment described above, the server 30 sent the parking position of the in-vehicle device 1 without waiting for a special request from the portable terminal 10 when the condition is satisfied. Nevertheless, the server 30 may also send the parking position of the in-vehicle device 1 to the portable terminal 10 upon receiving a parking position request from the in-vehicle device 10.

Figure 13:
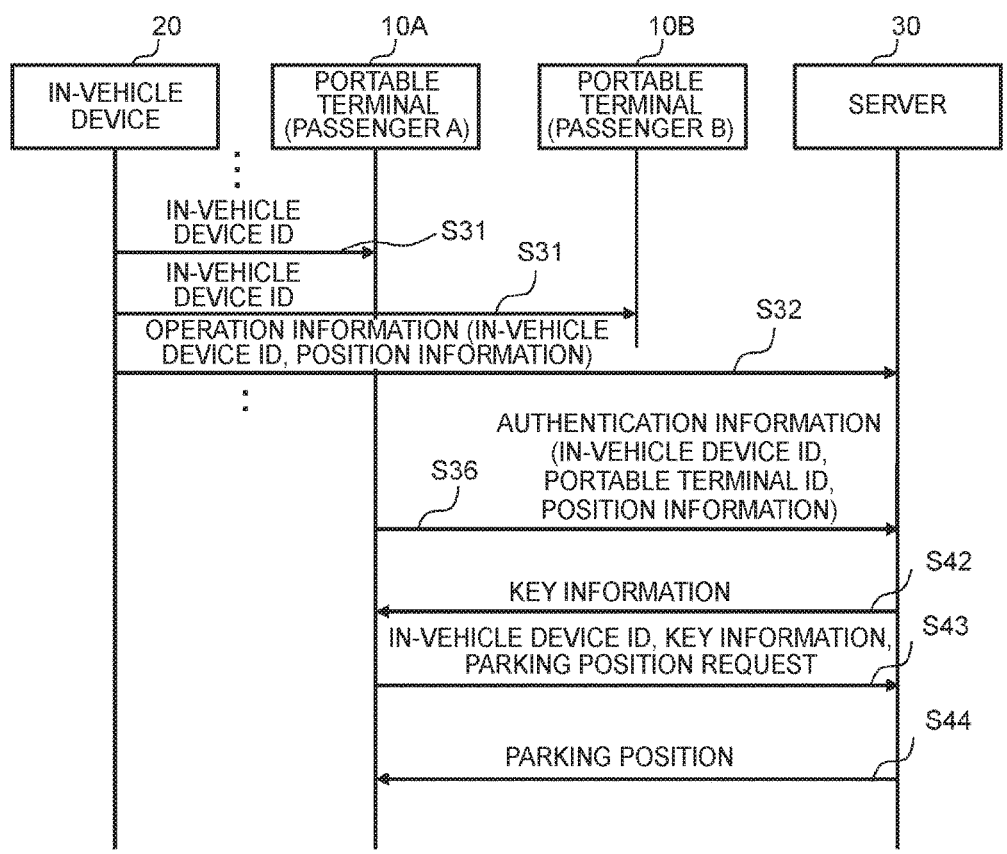
FIG. 13 is a diagram explaining the overview of the operation of the authentication system S in modified example 15.

FIG. 13 is a diagram explaining the overview of the operation of the authentication system S in modified example 15. In FIG. 13, because the steps are the same as FIG. 6 in the first embodiment up to S36, the explanation thereof is omitted. In S42, the server 30 sends key information to the portable terminal 10A that sent the authentication information. This key information may or may not be the same as the key information sent in S34. This is because the key information set in S42 indicates that it has been authenticated by the server 30, and is not compared with the private key 211 stored in the in-vehicle device 20. The portable terminal 10A that received the key information from the server 30 sends, to the server 30, the received key information, the in-vehicle terminal ID, and a parking position request (S43). The transmission in S43 by the portable terminal 10A may be automatically performed with the reception of the key information in S42 as the trigger, or may be executed based on the user's express operation. The server 30 that received the communication of S43 determines whether the received key information matches the key information sent in S42, and, upon determining that they are a match, sends the last received position from the received in-vehicle device ID as the parking position to the portable terminal 10A (S44).

Second Embodiment

The second embodiment of the authentication system S is now explained with reference to FIG. 14 and FIG. 15. In the ensuing explanation, the same reference numeral is given to the same constituent elements as the first embodiment, and the differences in comparison to the first embodiment will mainly be explained. Points that are not specifically explained are the same as the first embodiment. This embodiment differs from the first embodiment mainly with respect to the point that the approval of the administrator of the in-vehicle device 20 is required upon sending the key information from the server 30 to the portable terminal 10. Because the hardware configuration of the authentication system S in the second embodiment is the same as the first embodiment, the explanation thereof is omitted.

(Functional Block of Authentication System S)

Figure 14:
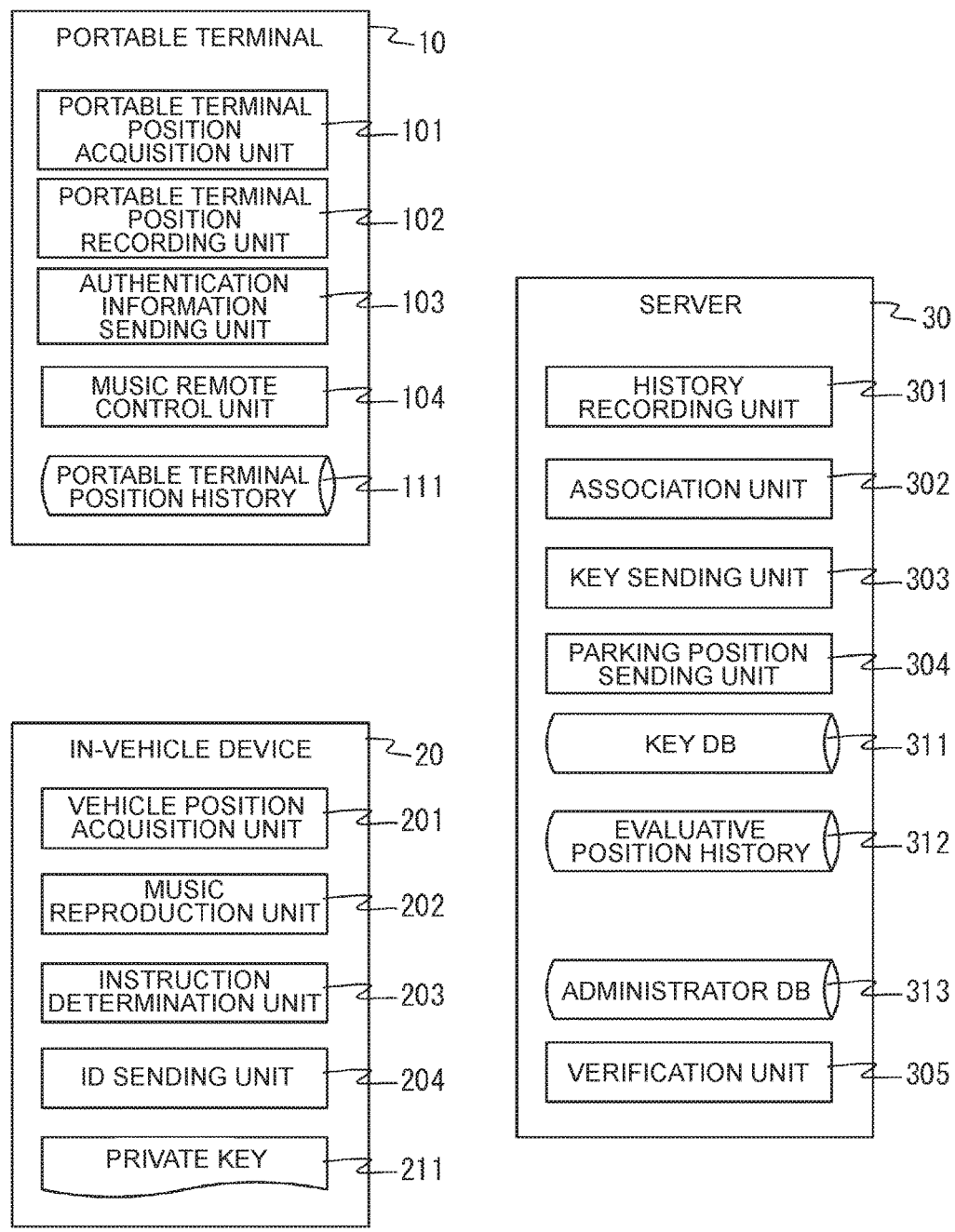
FIG. 14 is a functional configuration diagram of the authentication system S in the second embodiment.

FIG. 14 is a functional block diagram showing the functional configuration of the authentication system S in the second embodiment. The difference in comparison to the functional configuration of the authentication system S in the first embodiment shown in FIG. 3 is that the server 30 additionally comprises an administrator DB 313 and a verification unit 305. Moreover, in this embodiment, the authentication information sending unit 103 of the portable terminal 10 sends the user's nickname stored in the flash memory 17 together with the authentication information.

The administrator DB 313 stores contact information, such as a phone number of an email address, of the administrator of the in-vehicle device 20 for each in-vehicle device ID. Prior to sending the key information to the in-vehicle device 20, the verification unit 305 refers to the administrator DB 313 and acquires the contact information of the in-vehicle device 20 for which the key information is used, and sends the key information to the in-vehicle device 20 when the administrator's approval is obtained.

Figure 15:
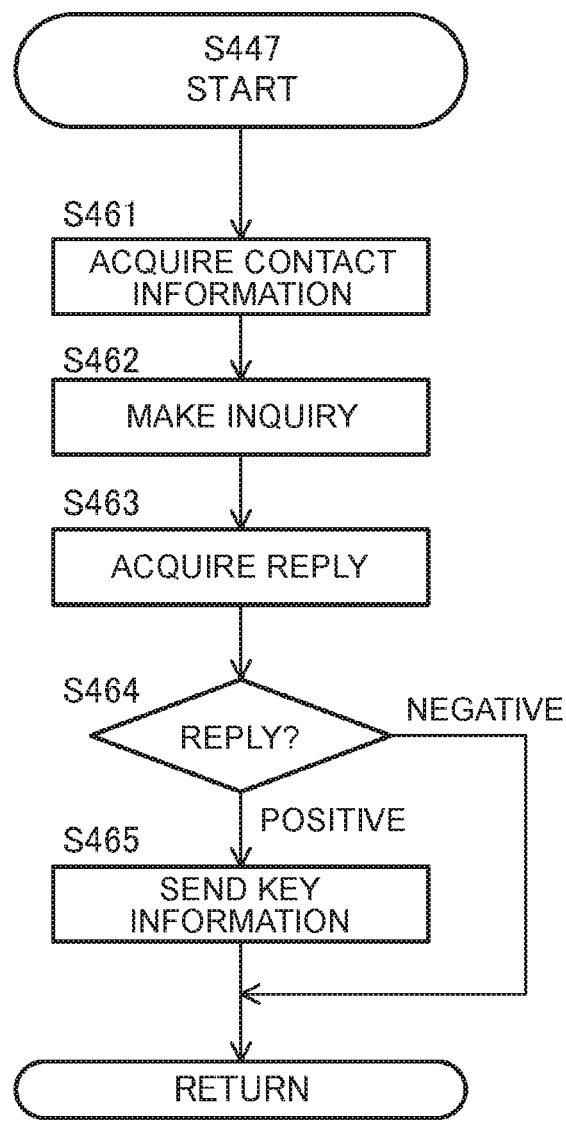
FIG. 15 is a flowchart illustrating the processing of the verification unit 305.

FIG. 15 is a flowchart illustrating the processing of the verification unit 305. The subject that executes the respective steps of the flowchart explained below is the CPU 31 of the server 30. The flowchart explained below is executed in substitute for step S447 of FIG. 10. In the ensuing explanation, the in-vehicle device ID recorded in step S442 before the execution of step S447 is referred to as the "in-vehicle device ID to be processed", and the portable terminal ID similarly recorded in step S442 is referred to as the "portable terminal ID to be processed".

In step S461, the server 30 refers to the administrator DB 313, and acquires the contact information corresponding to the in-vehicle device ID to be processed. In subsequent step S462, the server 30 sends, to the acquired contact information, a message to the effect of requesting premising to sending the received user's nickname and the key information together with the authentication information. For example, when the acquired contact information is a phone number, the server 30 makes a call and outputs a voice message to the effect of "Is it okay to send key information to Mr. A?". Moreover, when the acquired contact information is an email address, the server 30 sends an email containing the foregoing message in the main text. In subsequent step S463, the server 30 evaluates the reply from the administrator. For example, in the case of a phone call, the server 30 evaluates the administrator's reply using voice recognition, and in the case of email, the server 30 evaluates the administrator's reply based on syntax analysis or pattern matching.

In subsequent step S464, the server 30 determines whether the administrator's reply evaluated in step S463 was positive or negative. The server 30 proceeds to step S465 upon determining that it was a positive reply, and ends the program of the operation illustrated in FIG. 15 upon determining that it was a negative reply. In step S465, the server 30 sends, to the portable terminal 10 having the portable terminal ID to be processed, the key information corresponding to the in-vehicle device ID to be processed, and then ends the program of the operation illustrated in FIG. 15.

According to the second embodiment described above, the following effects are yielded in addition to the effects of the first embodiment.

(6) The server 30 comprises an administrator database 313 which stores contact information of an administrator corresponding to each of the in-vehicle device IDs, and a verification unit 305. When the association unit 302 performs association (step S445 of FIG. 10: NO), the verification unit 305 refers to the administrator database 313 and identifies the contact information of the administrator corresponding to the in-vehicle device ID which was associated by the association unit 302 (step S461 of FIG. 15). Subsequently, the verification unit 350 sends an approval inquiry for issuing the key information to the identified contact information of the administrator (step S462 of FIG. 15), and, when a positive reply is obtained from the administrator (step S464 of FIG. 15: POSITIVE), sends the key information to the key sending unit 303 (step S465 of FIG. 15). In other words, because the approval of the administrator of the in-vehicle device 20 is required for issuing the key information, it is possible to prevent the issue of key information that is not intended by the administrator.

Modified Example of Second Embodiment

The in-vehicle device 20 is able to accept a plurality of pieces of key information, and the permitted operation may be changed depending on the key information. In the foregoing case, the server 30 may send key information corresponding to an operation of low importance without obtaining the administrator's approval, and may send key information corresponding to an operation of high importance only upon obtaining the administrator's approval. The expression "operation of high importance" refers to, for example, the unlocking of the door or the ignition of the engine which may lead to the theft of the own vehicle 2.

Third Embodiment

The third embodiment of the authentication system is now explained with reference to FIG. 16. In the ensuing explanation, the same reference numeral is given to the same constituent elements as the first embodiment, and the differences in comparison to the first embodiment will mainly be explained. Points that are not specifically explained are the same as the first embodiment. This embodiment differs from the first embodiment mainly with respect to the point that the portable terminal ID associated with the in-vehicle device 20 is sent in substitute for sending the key information to the portable terminal 10 associated by the server 30. Because the hardware configuration of the authentication system S in the third embodiment is the same as the first embodiment, the explanation thereof is omitted.

(Functional Block of Authentication System S)

Figure 16:
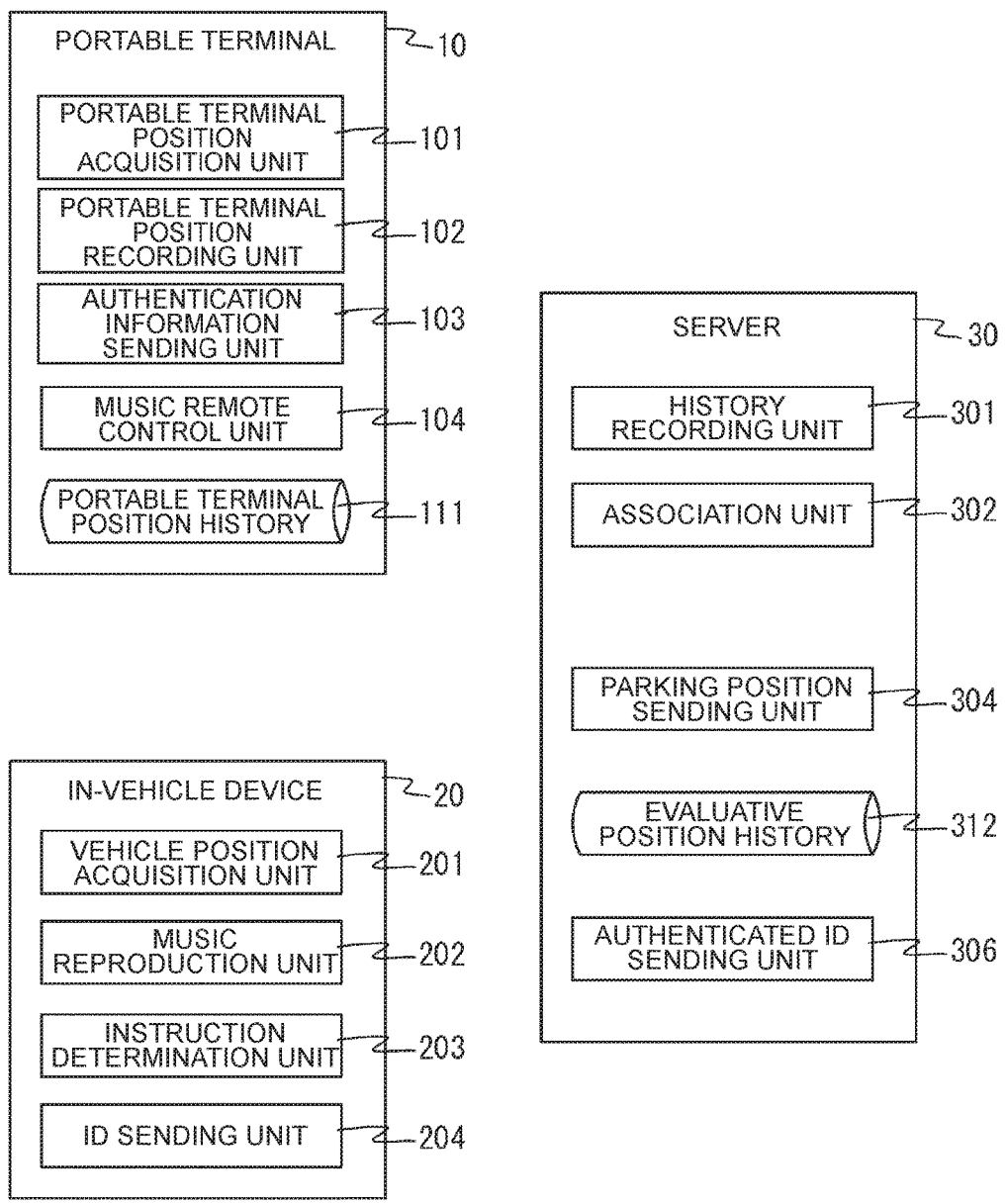
FIG. 16 is a functional configuration diagram of the authentication system S in the third embodiment.

FIG. 16 is a functional block diagram showing the functional configuration of the authentication system S in the third embodiment. The main difference in comparison to the functional configuration of the authentication system S in the first embodiment shown in FIG. 3 is that the server 30 does not comprise a key sending unit 303 and a key DB 311, and the server 30 additionally comprises an authenticated ID sending unit 306. Moreover, in this embodiment, the in-vehicle device 20 does not comprise a private key 211. Furthermore, in this embodiment, the operation of the music remote control unit 104 of the portable terminal 10 and the operation of the instruction determination unit 203 of the in-vehicle device 20 are also different from the first embodiment.

With regard to the portable terminal ID and the in-vehicle device ID that were associated by the association unit 302, the authenticated ID sending unit 306 sends that portable terminal ID to the in-vehicle device 20 having that in-vehicle device ID. The music remote control unit 104 of the portable terminal 10 sends the portable terminal ID of that portable terminal 10 to the in-vehicle device 20 together with the user's music control command. The in-vehicle device 20 stores the portable terminal ID received from the server 30 in the RAM 23. When the in-vehicle device 20 receives the music control command and the portable terminal ID from the portable terminal 10, the in-vehicle device 20 determines that the portable terminal 10 has been authenticated by the server 30 when the received portable terminal ID is the same as the portable terminal ID that was received from the server 30 and stored in the RAM 23, and outputs the received music control command to the music reproduction unit 202.

The following effects are yielded according to the third embodiment described above.

(7) The server 30 comprises an authenticated ID sending unit 306 which sends, to the in-vehicle device having the in-vehicle device ID which was associated by the association unit 302, the portable terminal ID which was associated by the association unit 302. Thus, it is possible to clearly specify that the portable terminal 10 has been associated without having to use the key information. With this method, it is not necessary to pre-store the key information in the server 30. Moreover, because key information is not used in the first place, there is no risk of the key information being leaked.

While the programs were explained as being stored in the respective ROMs of the portable terminal 10, the in-vehicle device 20, and the server 30, the programs may also be stored in a flash memory or a non-volatile memory such as a hard disk. Moreover, the programs may also be read from another device via a medium that can be accessed by the respective devices. The term "medium" used herein refers to a storage medium that can be attached to and detached from an I/O interface, or a communication medium such as a wired, wireless or optical network, or carrier waves or digital signals that propagate such network. Moreover, a part or all of the functions realized by the programs may also be realized with a hardware circuit or FPGA.

Each of the embodiments and modified examples described above may also be respectively combined. While various embodiments and modified examples were explained above, the present invention is not limited to the subject matter thereof. Other modes that fall within the scope of the technical concept of the present invention are also covered by the present invention.

Note that the following method is also covered by the scope of the present invention.

The first association method is an association method which is executed in an in-vehicle device, a portable terminal, and a server, comprising the steps of: the in-vehicle device: storing an in-vehicle device ID as an identifier for identifying the in-vehicle device; sending the in-vehicle device ID to the portable terminal within a predetermined communication range; calculating a vehicle position as a position of the in-vehicle device; and sending the in-vehicle device ID and the vehicle position to the server, and the portable terminal: storing a portable terminal ID as an identifier for identifying the portable terminal; calculating a portable terminal position as a position of the portable terminal; receiving the in-vehicle device ID from the in-vehicle device without any operation of the portable terminal by a user within the predetermined communication range; and sending, to the server, authentication information configured from the portable terminal ID, the received in-vehicle device ID, and the portable terminal position, wherein the server associates the portable terminal ID and the in-vehicle device ID based on a difference between the received portable terminal position and the received vehicle position.

The second association method is a method which, in addition to the first association method, further comprises the steps of the server: storing a key database which stores key information corresponding to each of the in-vehicle devices; and sending the key information corresponding to the associated the in-vehicle device ID to the portable terminal having the associated portable terminal ID.

The third association method is a method which, in addition to the second association method, further comprises the steps of the server: storing an administrator database which stores contact information of an administrator corresponding to each of the in-vehicle device IDs; and when the association is performed, referring to the administrator database and identifying the contact information of the administrator corresponding to the associated in-vehicle device ID, sending an approval inquiry for issuing the key information to the identified contact information of the administrator, and, when a positive reply is obtained from the administrator, sending the key information.

The fourth association method is a method which, in addition to the first association method, further comprises the step of the server: sending position information which was last received from the in-vehicle device having the associated in-vehicle device ID to the portable terminal having the associated portable terminal ID.

The fifth association method is a method which, in addition to the first association method, further comprises the step of the server: sending the associated portable terminal ID to the in-vehicle device having the associated in-vehicle device ID.

The sixth association method is a method wherein, in addition to the first association method, the portable terminal sends the authentication information in at least one of either a case when sending of the in-vehicle device ID from the in-vehicle device is interrupted and a case when sending of the in-vehicle device ID from the in-vehicle device reaches a predetermined number of times.

The seventh association method is a method wherein, in addition to the first association method, the in-vehicle device sends the in-vehicle device ID when a speed of a vehicle equipped with the in-vehicle device falls below a predetermined speed.

REFERENCE SIGNS LIST 2 own vehicle
10 portable terminal
15 portable beacon communication unit
20 in-vehicle device
25 in-vehicle beacon communication unit
30 server
103 authentication information sending unit
111 portable terminal position history
203 instruction determination unit
204 ID sending unit
205 operation information sending unit
301 history recording unit
302 association unit
303 key sending unit
304 parking position sending unit
311 key database
312 evaluative position history

The invention claimed is:

1. An association system comprising:
an in-vehicle device,
a portable terminal, and
a server,
wherein the in-vehicle device comprises:
an in-vehicle storage unit which stores an in-vehicle device ID as an identifier for identifying the in-vehicle device;
a first communication unit which broadcasts the in-vehicle device ID to the portable terminal via a beacon payload;
a vehicle position acquisition unit which acquires a vehicle position as a position of the in-vehicle device; and
a second communication unit which sends the in-vehicle device ID and the vehicle position to the server,
wherein the portable terminal comprises:
a portable storage unit which stores a portable terminal ID as an identifier for identifying the portable terminal;
a portable terminal position acquisition unit which acquires a portable terminal position as a position of the portable terminal; and
an authentication information sending unit which sends, to the server, authentication information including the portable terminal ID, the received in-vehicle device ID, and the portable terminal position, and
wherein the server comprises:
an association unit which determines whether a difference between the portable terminal position included in the received authentication information and the received vehicle position is within a predetermined range; and when the difference is within the predetermined range and a difference of received time of the authentication information and the vehicle position are within a predetermined time, associates the portable terminal ID and the in-vehicle device ID.

2. The association system according to claim 1, wherein the server further comprises:
a key database which stores key information corresponding to each of the in-vehicle devices; and a key sending unit which sends, to the portable terminal having the portable terminal ID which was associated by the association unit, the key information corresponding to the in-vehicle device 1D which was associated by the association unit.

3. The association system according to claim 2, wherein the server further comprises:
an administrator database which stores contact information of an administrator corresponding to each of the in-vehicle device IDs; and
a verification unit which, when the association unit performs association, refers to the administrator database and identifies the contact information of the administrator corresponding to the in-vehicle device ID which was associated by the association unit, sends an approval inquiry for issuing the key information to the identified contact information of the administrator, and, when a positive reply is obtained from the administrator, sends the key information to the key sending unit.

4. The association system according to claim 1, wherein the server further comprises: a parking position sending unit which sends, to the portable terminal having the portable terminal ID which was associated by the association unit, position information which was last received from the in-vehicle device having the in-vehicle device ID which was associated by the association unit.

5. The association system according to claim 1, wherein the server further comprises: an authenticated ID sending unit which sends, to the in-vehicle device having the in-vehicle device ID which was associated by the association unit, the portable terminal ID which was associated by the association unit.

6. The association system according to claim 1, wherein the authentication information sending unit of the portable terminal sends the authentication information in at least one of either a case when sending of the in-vehicle device ID from the in-vehicle device is interrupted and a case when sending of the in-vehicle device 1D from the in-vehicle device reaches a predetermined number of times.

7. The association system according to claim 1, wherein the first communication unit of the in-vehicle device sends the in-vehicle device ID when a speed of a vehicle equipped with the in-vehicle device falls below a predetermined speed.

8. An association method executed in an in-vehicle device, a portable terminal, and a server, comprising the steps of:
by the in-vehicle device:
storing an in-vehicle device ID as an identifier for identifying the in-vehicle device;
broadcasting the in-vehicle device ID to the portable terminal via a beacon payload;
calculating a vehicle position as a position of the in-vehicle device; and
sending the in-vehicle device ID and the vehicle position to the server, and by the portable terminal:
storing a portable terminal ID as an identifier for identifying the portable terminal;
calculating a portable terminal position as a position of the portable terminal;
receiving the in-vehicle device ID from the in-vehicle device without any operation of the portable terminal by a user within the predetermined communication range; and
sending, to the server, authentication information configured from the portable terminal ID, the received in-vehicle device ID, and the portable terminal position,
determining, by the server, whether a difference between the received portable terminal position and the received vehicle position is within a predetermined range; and when a difference is within the predetermined range and a difference of received time of the authentication information and the vehicle position are within a predetermined time, the server associates the portable terminal ID and the in-vehicle device ID.

9. The association method according to claim 8, further comprising the steps of:
by the server:
storing a key database which stores key information corresponding to each of the in-vehicle devices; and
sending the key information corresponding to the associated the in-vehicle device ID to the portable terminal having the associated portable terminal ID.

10. The association method according to claim 9, further comprising the steps of:
by the server:
storing an administrator database which stores contact information of an administrator corresponding to each of the in-vehicle device IDs; and
when the association is performed, referring to the administrator database and identifying the contact information of the administrator corresponding to the associated in-vehicle device ID, sending an approval inquiry for issuing the key information to the identified contact information of the administrator, and, when a positive reply is obtained from the administrator, sending the key information.

11. The association method according to claim 8, further comprising the step of:
by the server:
sending position information which was last received from the in-vehicle device having the associated in-vehicle device ID to the portable terminal having the associated portable terminal ID.

12. The association method according to claim 8, further comprising the step of:
by the server:
sending the associated portable terminal ID to the in-vehicle device having the associated in-vehicle device ID.

13. The association method according to claim 8, wherein the portable terminal sends the authentication information in at least one of either a case when sending of the in-vehicle device ID from the in-vehicle device is interrupted and a case when sending of the in-vehicle device ID from the in-vehicle device reaches a predetermined number of times.

14. The association method according to claim 8, wherein the in-vehicle device sends the in-vehicle device ID when a speed of a vehicle equipped with the in-vehicle device falls below a predetermined speed.

* * * * *

UNITED STATES PATENT AND TRADEMARK OFFICE
CERTIFICATE OF CORRECTION

PATENT NO. : 10,349,220 B2
APPLICATION NO. : 16/035481
DATED : July 9, 2019
INVENTOR(S) : Takashi Yamaguchi et al.

It is certified that error appears in the above-identified patent and that said Letters Patent is hereby corrected as shown below:

In the Claims

Column 23, Line 4, Claim 2    delete "1D" and insert -- ID --

Column 23, Line 39, Claim 6   delete "1D" and insert -- ID --

Column 23, Line 46, Claim 8   after "method", insert -- which is --

Signed and Sealed this
Thirtieth Day of June, 2020

Andrei Iancu
*Director of the United States Patent and Trademark Office*